United States Patent
Vale et al.

(10) Patent No.: US 7,724,281 B2
(45) Date of Patent: May 25, 2010

(54) DEVICE FACILITATING EFFICIENT TRANSFER OF DIGITAL CONTENT FROM MEDIA CAPTURE DEVICE

(75) Inventors: Alan M. Vale, Mountain View, CA (US); Kurt Dammermann, San Francisco, CA (US); Robin G. Petravic, San Francisco, CA (US); Timothy W. Genske, Aptos, CA (US); William G. Swinton, Santa Cruz, CA (US); Eric O. Bodnar, Santa Cruz, CA (US)

(73) Assignee: Syniverse ICX Corporation, Tampa, FL (US)

( * ) Notice: Subject to any disclaimer, the term of this patent is extended or adjusted under 35 U.S.C. 154(b) by 729 days.

(21) Appl. No.: 10/068,254

(22) Filed: Feb. 4, 2002

(65) Prior Publication Data

US 2003/0146977 A1    Aug. 7, 2003

(51) Int. Cl.
*H04N 5/225* (2006.01)
*H04N 5/228* (2006.01)

(52) U.S. Cl. .............................. 348/207.1; 348/208.99; 348/208.15

(58) Field of Classification Search ............... 348/207.1, 348/208.15, 222.1, 231.9, 208.99, 333.01
See application file for complete search history.

(56) References Cited

U.S. PATENT DOCUMENTS

| | | |
|---|---|---|
| 4,443,786 A | 4/1984 | Hammerling et al. |
| 4,758,883 A | 7/1988 | Kawahara et al. |
| 4,992,887 A | 2/1991 | Aragaki |
| 5,053,861 A | 10/1991 | Tsai et al. |

(Continued)

FOREIGN PATENT DOCUMENTS

EP    0 667 718 A    8/1995

(Continued)

OTHER PUBLICATIONS

Araki, Hitoshi et al. "A Non-Stop Updating Technique for Device Driver Programs on the IROS Platform," Jun. 1995, IEEE, vol. 1, pp. 88-92.

(Continued)

*Primary Examiner*—Kelly L Jerabek
(74) *Attorney, Agent, or Firm*—Blakely, Sokoloff, Taylor & Zafman, LLP; Judith A. Szepesi

(57) ABSTRACT

A method facilitating the transfer of information from a media or data capture device to a larger device while providing valuable feedback about the transfer is described. A transfer device including a simple user interface that can be easily implemented on a media or data capture device provides feedback about the transfer operation, enabling the user to take action when necessary. For example, the user is advised if the transfer is complete or, alternatively, that the transfer has failed and needs to redone. Feedback is provided by visual signals and may also be accompanied by audible signals. All necessary transfer functionality is included on the media capture device, thereby avoiding the requirement for dedicated software on a host (or pipeline) device, such as a cellular phone. This expands the number of pipeline devices that can be utilized with particular media capture devices. As long as there is a correct interface between the data capture device and the pipeline device, all the necessary transfer functionality can be included in the data capture device.

29 Claims, 7 Drawing Sheets

U.S. PATENT DOCUMENTS

| | | |
|---|---|---|
| 5,067,029 A | 11/1991 | Takahashi |
| 5,172,227 A | 12/1992 | Tsai et al. |
| 5,249,053 A | 9/1993 | Jain |
| 5,319,751 A | 6/1994 | Garney |
| 5,347,627 A | 9/1994 | Hoffman et al. |
| 5,412,427 A | 5/1995 | Rabbani et al. |
| 5,416,903 A | 5/1995 | Malcolm |
| 5,425,077 A | 6/1995 | Tsoi |
| 5,430,827 A | 7/1995 | Rissanen |
| 5,437,010 A | 7/1995 | Balckman et al. |
| 5,526,037 A | 6/1996 | Cortjens et al. |
| 5,526,047 A | 6/1996 | Sawanobori |
| 5,541,656 A | 7/1996 | Kare et al. |
| 5,548,789 A | 8/1996 | Nakanura |
| 5,552,824 A | 9/1996 | DeAngelis et al. |
| 5,596,702 A | 1/1997 | Stucka et al. |
| 5,606,365 A | 2/1997 | Maurinus et al. |
| 5,608,490 A | 3/1997 | Ogawa |
| 5,627,916 A | 5/1997 | Horiuchi |
| 5,652,621 A | 7/1997 | Adams, Jr. et al. |
| 5,657,077 A | 8/1997 | DeAngelis et al. |
| 5,675,831 A | 10/1997 | Caputo |
| 5,682,152 A | 10/1997 | Wang et al. |
| 5,710,894 A | 1/1998 | Maulsby et al. |
| 5,734,831 A | 3/1998 | Sanders |
| 5,737,491 A | 4/1998 | Allen et al. |
| 5,754,227 A | 5/1998 | Fukuoka |
| 5,761,655 A | 6/1998 | Hoffman |
| 5,781,743 A | 7/1998 | Matsuno et al. |
| 5,790,878 A | 8/1998 | Anderson et al. |
| 5,798,794 A | 8/1998 | Takahashi |
| 5,806,005 A | 9/1998 | Hull et al. |
| 5,815,205 A | 9/1998 | Hashimoto et al. |
| 5,818,525 A | 10/1998 | Elabd |
| 5,826,023 A | 10/1998 | Hall et al. |
| 5,835,580 A | 11/1998 | Fraser |
| 5,848,193 A | 12/1998 | Garcia |
| 5,870,383 A | 2/1999 | Eslambolchi et al. |
| 5,880,856 A | 3/1999 | Ferriere |
| 5,896,502 A | 4/1999 | Shieh et al. |
| 5,905,736 A | 5/1999 | Ronen et al. |
| 5,911,044 A | 6/1999 | Lo et al. |
| 5,913,088 A | 6/1999 | Moghadam et al. |
| 5,915,112 A | 6/1999 | Boutcher |
| 5,917,542 A | 6/1999 | Moghadam et al. |
| 5,928,325 A | 7/1999 | Shaughnessy et al. |
| 5,950,190 A | 9/1999 | Yeager et al. |
| 5,995,100 A | 11/1999 | Auslander |
| 6,005,613 A | 12/1999 | Endsley et al. |
| 6,008,847 A | 12/1999 | Bauchspies |
| 6,009,201 A | 12/1999 | Acharya |
| 6,009,480 A | 12/1999 | Pleso |
| 6,020,920 A | 2/2000 | Anderson |
| 6,023,585 A | 2/2000 | Perlman et al. |
| 6,028,807 A | 2/2000 | Awsienko |
| 6,031,964 A | 2/2000 | Anderson |
| 6,043,837 A | 3/2000 | Driscoll, Jr. et al. |
| 6,064,437 A | 5/2000 | Phan et al. |
| 6,064,671 A | 5/2000 | Killian |
| 6,065,120 A | 5/2000 | Laursen et al. |
| 6,067,383 A | 5/2000 | Taniguchi et al. |
| 6,067,568 A | 5/2000 | Li et al. |
| 6,067,571 A | 5/2000 | Igarashi et al. |
| 6,085,249 A | 7/2000 | Wang et al. |
| 6,091,777 A | 7/2000 | Guetz et al. |
| 6,094,689 A | 7/2000 | Embry et al. |
| 6,101,320 A | 8/2000 | Schuetze et al. |
| 6,104,430 A | 8/2000 | Fukuoka |
| 6,122,526 A * | 9/2000 | Parulski et al. ............ 455/556.1 |
| 6,125,201 A | 9/2000 | Zador |
| 6,128,413 A | 10/2000 | Benamara |
| 6,148,354 A | 11/2000 | Ban |
| 6,154,493 A | 11/2000 | Acharya et al. |
| 6,157,746 A | 12/2000 | Sodagar et al. |
| 6,163,604 A | 12/2000 | Baulier et al. |
| 6,167,469 A | 12/2000 | Safai et al. |
| 6,195,026 B1 | 2/2001 | Acharya |
| 6,198,941 B1 | 3/2001 | Aho et al. |
| 6,202,060 B1 | 3/2001 | Tran |
| 6,226,752 B1 | 5/2001 | Gupta et al. |
| 6,233,608 B1 | 5/2001 | Laursen et al. |
| 6,239,837 B1 * | 5/2001 | Yamada et al. ............ 348/231.5 |
| 6,243,420 B1 | 6/2001 | Mitchell et al. |
| 6,259,469 B1 | 7/2001 | Ejima et al. |
| 6,269,402 B1 | 7/2001 | Lin et al. |
| 6,269,481 B1 | 7/2001 | Perlman et al. |
| 6,285,471 B1 | 9/2001 | Pornbacher |
| 6,285,775 B1 | 9/2001 | Wu et al. |
| 6,292,657 B1 | 9/2001 | Laursen et al. |
| 6,297,870 B1 * | 10/2001 | Nanba ........................ 355/18 |
| 6,311,215 B1 | 10/2001 | Bakshi et al. |
| 6,317,143 B1 | 11/2001 | Wugofski |
| 6,330,007 B1 | 12/2001 | Isreal et al. |
| 6,330,068 B1 | 12/2001 | Matsuyama |
| 6,330,613 B1 | 12/2001 | Vlajnic et al. |
| 6,335,783 B1 | 1/2002 | McDonald |
| 6,336,142 B1 | 1/2002 | Kato et al. |
| 6,344,875 B1 | 2/2002 | Hashimoto et al. |
| 6,348,929 B1 | 2/2002 | Acharya et al. |
| 6,353,848 B1 | 3/2002 | Morris |
| 6,360,252 B1 | 3/2002 | Rudy et al. |
| 6,385,177 B1 | 5/2002 | Suda et al. |
| 6,389,464 B1 | 5/2002 | Krishnamurthy et al. |
| 6,390,371 B1 | 5/2002 | Armga et al. |
| 6,392,697 B1 | 5/2002 | Tanaka et al. |
| 6,392,699 B1 | 5/2002 | Acharya |
| 6,393,470 B1 * | 5/2002 | Kanevsky et al. ............ 709/219 |
| 6,396,515 B1 | 5/2002 | Hetherington et al. |
| 6,400,903 B1 | 6/2002 | Conoval |
| 6,417,882 B1 | 7/2002 | Mahant-Shetti |
| 6,417,913 B2 | 7/2002 | Tanaka |
| 6,423,892 B1 | 7/2002 | Ramaswamy |
| 6,424,739 B1 | 7/2002 | Ukita et al. |
| 6,442,573 B1 | 8/2002 | Schiller et al. |
| 6,442,625 B1 | 8/2002 | Robinson et al. |
| 6,445,412 B1 | 9/2002 | Shiohara |
| 6,449,495 B1 | 9/2002 | Kuba |
| 6,449,658 B1 | 9/2002 | Lafe et al. |
| 6,457,044 B1 | 9/2002 | IwaZaki |
| 6,459,816 B2 | 10/2002 | Matsuura et al. |
| 6,463,177 B1 | 10/2002 | Li et al. |
| 6,480,853 B1 | 11/2002 | Jain |
| 6,480,901 B1 | 11/2002 | Weber et al. |
| 6,487,717 B1 | 11/2002 | Brunemann et al. |
| 6,505,236 B1 | 1/2003 | Pollack |
| 6,507,362 B1 | 1/2003 | Akerib |
| 6,507,864 B1 | 1/2003 | Klein et al. |
| 6,509,910 B1 | 1/2003 | Agarwal et al. |
| 6,512,529 B1 | 1/2003 | Janssen et al. |
| 6,512,919 B2 | 1/2003 | Ogasawara |
| 6,529,804 B1 | 3/2003 | Draggon et al. |
| 6,529,969 B1 | 3/2003 | Inoue |
| 6,535,243 B1 | 3/2003 | Tullis |
| 6,539,169 B1 | 3/2003 | Tsubaki et al. |
| 6,542,186 B2 * | 4/2003 | Uryu ........................ 348/231.7 |
| 6,542,748 B2 * | 4/2003 | Hendrey et al. .......... 455/456.1 |
| 6,546,143 B1 | 4/2003 | Taubman et al. |
| 6,549,958 B1 | 4/2003 | Kuba |
| 6,577,338 B1 | 6/2003 | Tanaka et al. |
| 6,583,813 B1 | 6/2003 | Enright et al. |
| 6,598,076 B1 | 7/2003 | Chang et al. |
| 6,600,930 B1 | 7/2003 | Sakurai et al. |
| 6,606,669 B1 | 8/2003 | Nakagiri |
| 6,615,088 B1 | 9/2003 | Myer et al. |

| | | |
|---|---|---|
| 6,615,224 B1 | 9/2003 | Davis |
| 6,628,325 B1 | 9/2003 | Steinberg et al. |
| 6,630,954 B1 * | 10/2003 | Okada .................... 348/231.7 |
| 6,633,907 B1 | 10/2003 | Spencer et al. |
| 6,636,259 B1 | 10/2003 | Anderson et al. |
| 6,643,694 B1 | 11/2003 | Chernin |
| 6,694,354 B1 | 2/2004 | Elg |
| 6,704,712 B1 | 3/2004 | Bleiweiss |
| 6,704,824 B1 | 3/2004 | Goodman |
| 6,725,281 B1 | 4/2004 | Zintelo et al. |
| 6,725,300 B1 | 4/2004 | Nagasaka et al. |
| 6,734,994 B2 | 5/2004 | Omori |
| 6,742,043 B1 | 5/2004 | Moussa et al. |
| 6,763,040 B1 | 7/2004 | Hite et al. |
| 6,910,068 B2 | 6/2005 | Zintel et al. |
| 6,919,923 B1 | 7/2005 | Tanaka et al. |
| 6,930,709 B1 | 8/2005 | Creamer et al. |
| 6,934,698 B2 | 8/2005 | Judd et al. |
| 6,993,497 B2 | 1/2006 | Yeh et al. |
| 7,015,806 B2 | 3/2006 | Naidoo et al. |
| 7,020,881 B2 | 3/2006 | Takahashi et al. |
| 7,034,871 B2 | 4/2006 | Parulski et al. |
| 7,054,905 B1 | 5/2006 | Hanna et al. |
| 7,103,357 B2 | 9/2006 | Kirani et al. |
| 7,265,779 B2 * | 9/2007 | Sato et al. ................ 348/207.1 |
| 2001/0002845 A1 | 6/2001 | Tamashima |
| 2001/0007107 A1 | 7/2001 | Yamaguchi |
| 2001/0019359 A1 | 9/2001 | Parulski et al. |
| 2001/0023461 A1 | 9/2001 | Hata et al. |
| 2001/0030692 A1 * | 10/2001 | Yoneda ....................... 348/207 |
| 2001/0049648 A1 | 12/2001 | Naylor et al. |
| 2001/0049693 A1 | 12/2001 | Pratt |
| 2001/0054075 A1 | 12/2001 | Miyanaga |
| 2002/0001042 A1 * | 1/2002 | Terakado et al. ............. 348/460 |
| 2002/0032027 A1 | 3/2002 | Kirani et al. |
| 2002/0051065 A1 * | 5/2002 | Takahashi ................... 348/232 |
| 2002/0054212 A1 * | 5/2002 | Fukuoka ..................... 348/207 |
| 2002/0082001 A1 | 6/2002 | Tanaka et al. |
| 2002/0083004 A1 | 6/2002 | Saneto et al. |
| 2002/0108118 A1 * | 8/2002 | Cohen et al. ................. 725/105 |
| 2002/0120693 A1 | 8/2002 | Rudd et al. |
| 2002/0151283 A1 | 10/2002 | Pallakoff |
| 2002/0164977 A1 | 11/2002 | Link, II et al. |
| 2002/0169823 A1 | 11/2002 | Coulombe et al. |
| 2002/0171737 A1 | 11/2002 | Tullis |
| 2002/0194414 A1 * | 12/2002 | Bateman et al. ............. 710/303 |
| 2003/0093565 A1 | 5/2003 | Berger et al. |
| 2003/0115277 A1 | 6/2003 | Watanabe et al. |
| 2003/0133015 A1 * | 7/2003 | Jackel et al. ............. 348/207.1 |
| 2003/0135681 A1 | 7/2003 | Laity et al. |
| 2003/0142215 A1 | 7/2003 | Ward et al. |
| 2004/0078304 A1 | 4/2004 | Gabbard et al. |
| 2004/0109063 A1 | 6/2004 | Kusaka et al. |
| 2004/0171371 A1 | 9/2004 | Paul |
| 2006/0173781 A1 | 8/2006 | Donner |

FOREIGN PATENT DOCUMENTS

| | | | |
|---|---|---|---|
| EP | 0763943 | A2 | 9/1997 |
| EP | 0835013 | A2 | 4/1998 |
| EP | 095 0969 | A2 | 10/1999 |
| EP | 0949805 | A2 | 10/1999 |
| EP | 0950969 | A2 | 10/1999 |
| GB | 2289555 | A | 11/1995 |
| GB | 2365177 | A | 2/2002 |
| WO | WO 9906910 | A | 2/1999 |
| WO | WO 99/13429 | A1 | 3/1999 |
| WO | WO 99/60793 | A1 | 11/1999 |
| WO | PCT/GB00/01962 | A1 | 11/2000 |
| WO | WO 00/72534 | A1 | 11/2000 |
| WO | WO 00/75859 | A1 | 12/2000 |
| WO | PCT/SE00/00807 | A1 | 1/2001 |
| WO | WO 01/01663 | A1 | 1/2001 |
| WO | PCT/KR01/01323 | A1 | 2/2002 |
| WO | WO 02/13031 | A1 | 2/2002 |

OTHER PUBLICATIONS

Corcoran, Peter M. et al., Internet Enabled Digital Photography, International Conference on Consumer Electronics, Jun. 22, 1999, pp. 84-85.
Gosling, J. et al., The Java Language Environment: Contents, Sun Microsystems Computer Company, May 1996, 82 pgs.
Lindley, Craig A., JPEG-Like Image Compression, Part 1, Dr. Dobb's Journal, Jul. 1995.
Lindley, Craig A., JPEG-Like Image Compression, Part 2, Dr. Dobb's Journal, Aug. 1995.
Padmanabhan, K. and Kumar, K. Kennedy, A Scheme for Data Collection from Unattended Instruments by a Personal Computer, May 1992, IEEE, pp. 612-615.
PCT International Preliminary Examination Report for International Application No. PCT/US01/40216, mailed Sep. 9, 2004.
Pigeon, Steven, Image Compression with Wavelets, Dr. Dobb's Journal, Aug. 1999, pp. 111-115.
Pilling, Michael, Alan Burns and Kerry Raymond, "Formal Specifications and Proofs of Inheritance Protocols for Real-Time Scheduling", Software Engineering Journal, Sep. 1990, pp. 263-279.
Rekimoto et al., CyberCode: Desiging Augmented Reality Environments with Visual Tags, Apr. 2000, Proceeding of DARE 2000 on Design Augmented Reality Environments, 9 pgs.
Ricoh Corporation, "Ricoh Announces New 2.3 Megapixel Digital Camera," press release, Feb. 17, 1999, pp. 1-4.
Simpson, W. (Ed.), RFC 1661, The Point-to-Point Protocol (PPP), Jul. 1994.
Sha, Lui et al., "Priority Inheritance Protocols: An Approach to Real-Time Synchronization", IEEE Transactions on Computers, vol. 39, No. 9, Sep. 1990, pp. 1175-1185.
Socolofsky, T.J., et al., RFC 1180: TCP/IP Tutorial, Jan. 1, 1991, 30 pgs.
UPnP Device Architecture, Version 1.0, Jun. 8, 2000, Contributing Members of the UPnp Forum.
W3.ORG, Extensible Markup Language (XML) 1.0 (second edition) specification, Oct. 6, 2000.
Zigon, Robert, Run Length Encoding, Dr. Dobb's Journal, Feb. 1989.
Beyond Logic, USB 2.0 FPGA Boards, "USB in a Nutshell", http://www.beyondlogic.org/usbnutshell/usb6.html, Jan. 12, 2009, 6 pages.
PCT International Search Report for International Application No. PCT/US01/01595, mailed Jul. 31, 2001, 7 pages.
PCT Written Opinion for International Application No. PCT/US01/01595, mailed Oct. 16, 2001, 6 pages.
PCT International Search Report or the Declaration for International Application No. PCT/US01/06537, mailed Oct. 7, 2003, 8 pages.
PCT Written Opinion for International Application No. PCT/US01/06537, mailed Jan. 18, 2005, 5 pages.
PCT International Search Report or the Declaration for International Application No. PCT/US01/40216, mailed Nov. 20, 2002, 7 pages.
PCT International Search Report or the Declaration for International Application No. PCT/US00/15841, mailed Nov. 2, 2000, 6 pages.
PCT International Preliminary Examination Report for International Application No. PCT/US00/15841, mailed Nov. 12, 2002, 6 pages.
PCT Written Opinion for International Application No. PCT/US00/15841, mailed Dec. 21, 2001, 6 pages.
Supplementary European Search Report for European Patent Application No. 00939714.2-1522-US0015841, dated of completion May 10, 2005, 3 pages.
USB Complete: Enumeration, "From Chapter 4, Enumeration: How the Host Learns about Devices", http:www.lvr.com/usbcenum.html, 7 pages.
Foley, James D., et al., Book Title: Computer Graphics: Principles and Practice, 2nd Edition, Chapter 13 , "Achromatic and Colored Light", Addison-Wesley (Jun. 15, 1990) Reading, MA, pp. 563-604.

Haskell, B. G., et al., Book Title: Digital Video: An Introduction to MPEG-2, Chapter 5 "Video Basics" Chapman and Hall, Jul. 1997, pp. 80-109.

Li, Jin, et al., "Coding Artifact Removal with Multiscale Postprocessing," Proceedings, - IEEE International Conference on Image Processing '97, Santa Barbara, CA, Oct. 27-29, 1997, pp. 44-48.

Mann, Steve, "The Wireless Application Protocol," Dr. Dobb's Journal, Oct. 1999, pp. 56-66.

Nelson, M., et al., "The Data Compression Book," Second Edition, Chapters 4 & 5, pp. 75-152, M&T Books, 1996.

Nelson, M., et al , "The Data Compression Book," Second Edition, Chapter 11, Lossy Graphics Compression (portion at pp. 326-330), M&T Books, 1996.

Parker, T., et al., Book Title: TCP-IP Unleashed, Chapter 2: "Overview of TCp-IP," Sams Publishing, Jun. 1996, pp. 1-27.

Pennebaker, William B., et al., Book Title: JPEG — Still Image Compression Standard, Jan. 1993, Chapter 16 "JPEG Enhancements", pp. 261-266.

* cited by examiner

TRANSFER STATES

| EVENTS | TRANSFER STATUS LIGHT | TRANSFER FAILURE LIGHT | ACTION |
|---|---|---|---|
| NO CONNECTION FOUND | OFF | OFF | DISCONNECT RECONNECT |
| CONNECTION FOUND, NO MEDIA ON DEVICE | OFF | OFF | DISCONNECT CAPTURE MEDIA RECONNECT |
| SUCCESSFUL TRANSFER | OFF | OFF | DISCONNECT CAPTURE MEDIA RECONNECT |
| CONNECTION FOUND, MEDIA ON DEVICE | ON (STEADY) | OFF | PRESS TRANSFER BUTTON TO INITIATE MEDIA TRANSFER |
| TRANSFER STATUS LIGHT ON -- USER PRESSES TRANSFER BUTTON | BLINKING | OFF | MEDIA IS BEING TRANSFERRED |
| DATA TRANSFER FAILS, MEDIA STILL PRESENT ON DEVICE | ON (STEADY) | ON | PRESS TRANSFER BUTTON TO TRY TRANSFER AGAIN OR DISCONNECT |

FIG. 5

DEVICE FACILITATING EFFICIENT TRANSFER OF DIGITAL CONTENT FROM MEDIA CAPTURE DEVICE

RELATED APPLICATIONS

The present application is related to the following commonly-owned application(s): application Ser. No. 09/660,531, filed Sep. 13, 2000, entitled "System and Method for Dynamic Uploading and Execution of Applications and Drivers between Devices"; application Ser. No. 09/703,412, filed Oct. 31, 2000, entitled "Photo-serving Communication Protocols and Methodology for Providing Disparate Host Devices with FTP-like Access to Digital Images Residing on a Digital Camera Device"; and application Ser. No. 09/434,703, filed Nov. 5, 1999, entitled "Improved Digital Camera Device and Methodology for Distributed Processing and Wireless Transmission of Digital Images". The disclosures of each of the foregoing applications are hereby incorporated by reference in their entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to a system and methodology for improved exchange of objects (e.g., files, such as digital photographs) between a client device (e.g., digital camera) and a multitude of disparate host devices, for instance, upon connection of the client device to one or more different host devices.

2. Description of the Background Art

Today, digital imaging, in the form of digital cameras, is a prevalent reality that affords a new way to capture photos using a solid state image sensor instead of traditional film. A digital camera functions by recording incoming light on some sort of sensing mechanisms and then processes that information (basically, through analog-to-digital conversion) to create a memory image of the target picture. A digital camera's biggest advantage is that it creates images digitally, thus enabling the transfer of these images between all kinds of devices and applications. For instance, one can easily insert digital images into word processing documents, send them by e-mail to friends, or post them on a Web site where anyone in the world can see them. Additionally, one can use photo-editing software to manipulate digital images to improve or alter them. Digital cameras also provide immediate access to one's images, thus avoiding the hassle and delay of film processing. All told, digital photography is becoming increasingly popular because of the flexibility it gives the user when he or she wants to use or distribute an image.

Several other different types of information content may also be captured digitally through use of various recording or capturing devices. In addition to digital photographic images, other examples of digital media include digital video, digital audio, and various types of multi-media content. Examples of media capture devices include digital audio recorders, digital video recorders, and digital cameras. Typically, once information content is captured, it is then transmitted or "uploaded" to another host device, such as a server computer. For example, in the case of digital audio, a user may wish to transmit dictation captured on a wireless handheld device to a remote host device to facilitate storing, editing, printing, and sharing this information. Such transfers may be accomplished through a number of different wireless or wireline transmission means, including cable connection to a uniform serial bus (USB), wireless connection via infrared, or wireless connection through a device such as a cellular telephone. However, several problems exist with the transfer of information content from the media capture device to a second device.

The bandwidth limitations of today's wireless networks present one set of problems. Currently, wireless networks employ TCP/IP over communication networks supporting a transmission rate of only 9600 baud. This yields an effective throughput of only about 1 K (kilobytes) per minute. At such poor effective throughput rates, existing wireless networks pose a substantial bottleneck for the transmission of digital information content. For instance, a digital photographic image of 600 K may require several minutes to transmit. A relatively small MP3 audio file, say at 2 M (megabytes), would take much longer. The problem is also compounded by other limitations in existing wireless systems. In these systems often a "call" (i.e., session) will be lost (i.e., prematurely terminated). Practically all cellular phone users have experienced firsthand the annoying experience of having a cellular phone call dropped in the middle of a conversation. By the very nature that wireless systems are mobile, wireless calls are often dropped due to natural or physical obstructions, such as interference from mountains. At other times, however, a call may be dropped simply due to unreliability in the underlying cellular phone network.

Regardless of the cause of a user's session being prematurely terminated, a user transmitting information is often forced to not only re-establish communication, but also resend the entire contents that were in process of being transmitted, since most systems treat information content on a per-item basis. If a wireless call is lost during transmission of a digital image, for instance, most wireless systems require retransmission of the entire digital image, as each image is treated as a single unit. This retransmission problem is by no means limited to wireless systems. For example, when uploading a photographic image using a modem, any loss of the connection will result in the user having to completely retransmit the photo, despite the fact that the user may have previously uploaded a substantial portion of that very same photo.

Another problem, in the case of a transfer of information from a portable device, is that in most cases no mechanism is provided to enable the user to confirm that an effective connection to a server has been established and that information is, in fact, being transferred. For example, a user transmitting a digital photo to a remote server computer needs to be able to determine that a reliable connection has been established to the server. The user also requires a way to receive notification that the transfer is being successfully completed or, alternatively, that some problem has been encountered.

Current systems either provide very limited feedback to the user or, alternatively, require dedicated software or interface modules to enable the user to receive feedback regarding the transfer of information from a portable device to the remote device. Certain systems provide some rudimentary feedback about the transfer, such as indicating that the transfer process timed out or that a connection could not be established or was terminated. However, this feedback is typically limited to informing the user that the connection was not available or was dropped, without providing any further information about the problem or the status of the transfer of information. For example, telling the user that a connection has dropped does not let him or her know whether or not part of the information was successfully transferred.

A number of current systems provide more complete transfer functionality and feedback through software running on the server, but this requires the user to be in physical proximity to the server to monitor the transfer. This is not a practical solution when the server is remote, such as in the case of a wireless transfer or in the case involving a connection through another intermediary "pipeline" device.

Take, for instance, the transfer of digital images from a digital camera through a cellular telephone to a larger device. In this case, the cellular telephone is serving as a pipeline device from the digital camera to a server or network. Many pipeline devices do not have the capability of running additional software or otherwise providing an interface to facilitate the transfer and provide feedback to the user. Moreover, even if a pipeline device does have the necessary capabilities, the process of installing and operating additional software on this type of pipeline device is a burden for the user. Requiring installation and operation of additional software increases the complexity of performing the transfer, and also increases the chance of problems or errors being encountered. Another possible solution, pre-installation of an appropriate transfer interface into the cellular phone as part of the phone manufacturing process, requires cooperation and agreement on interoperability standards by various phone manufacturers. This is difficult to achieve and, even if achieved, would not address the large number of cellular phones already in use.

For these reasons, among others, it is preferable that the pipeline device not be required to run additional software or otherwise implement a particular interface to facilitate the transfer of digital information over the pipeline device. If the necessary transfer routines and user interface are provided on the media capture device, then the pipeline device only has to serve as a pipeline (as well as performing its other standard functions such as placing and receiving phone calls).

In the case of transfer of information from a media or data capture device, such as a digital camera, to a larger device or network, there is a requirement for an effective mechanism enabling a user to verify that a connection has been established and that information is, in fact, being transferred. The user also requires a way to receive notification that the transfer is being successfully completed or, alternatively, that some problem has been encountered. Ideally, this mechanism should be easy to use and should be implemented on the media capture device, so that installation of additional software or interface functionality on the pipeline device would not be required. The present invention fulfills these and other needs.

GLOSSARY

The following definitions are offered for purposes of illustration, not limitation, in order to assist with understanding the discussion that follows.

Data-capable: Cellular phones that are capable of transmitting (and receiving) digital data (packets) across their cellular network to be further distributed over the Internet or private digital networks are said to be "data-capable." Data-capable cellular phones can wirelessly communicate both analog voice streams and digital packets.

LCD: LCD is an abbreviation for liquid crystal display, a type of display used in digital watches and many portable computers. LCD displays utilize two sheets of polarizing material with a liquid crystal solution between them. An electric current passed through the liquid causes the crystals to align so that light cannot pass through them. Each crystal, therefore, is like a shutter, either allowing light to pass through or blocking the light.

LED: LED is an abbreviation of light emitting diode, an electronic device that lights up when electricity is passed through it. LEDs are typically used for displaying images because LEDs can be relatively small, and typically do not burn out.

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see, e.g., RFC 793, the disclosure of which is hereby incorporated by reference.

TCP/IP: TCP/IP stands for Transmission Control Protocol/Internet Protocol, the suite of communications protocols used to connect hosts on the Internet. TCP/IP uses several protocols, the two main ones being TOP and IP. TCP/IP is built into the UNIX operating system and is used by the Internet, making it the de facto standard for transmitting data over networks. For an introduction to TCP/IP, see e.g., RFC 1180: A TCP/IP Tutorial, the disclosure of which is hereby incorporated by reference.

URL: URL is an abbreviation of Uniform Resource Locator, the global address of documents and other resources on the World Wide Web. The first part of the address indicates what protocol to use, and the second part specifies the IP address or the domain name where the resource is located.

WAP: WAP stands for Wireless Application Protocol, which is a communication protocol, not unlike TCP/IP, that was developed by a consortium of wireless companies, including Motorola, Ericsson, and Nokia, for transmitting data over wireless networks. For a description of WAP, see e.g., Mann, S., *The Wireless Application Protocol*, Dr. Dobb's Journal, pp. 56-66, October 1999, the disclosure of which is hereby incorporated by reference.

SUMMARY OF THE INVENTION

Media or data capture devices are typically portable devices with limited resources in terms of processing power, memory, and storage capacity. Accordingly, a user of this type of device will often wish to transfer information to a larger device, such as a computer server, to facilitate storing, editing, sharing, and/or printing such information.

The present invention simplifies the transfer of information from a media capture device to a larger device while also providing valuable feedback about the status of the transfer. The transfer device of the present invention includes a simple user interface that can be easily implemented on a media or data capture device to facilitate the direct or indirect transfer of information. The transfer device enables a user of a media capture device to initiate a data transfer. It also provides valuable feedback about the transfer operation, enabling the user to take action when necessary. For example, the user is advised if the transfer is complete or, alternatively, that the transfer has failed and needs to redone.

The present invention enables all necessary transfer functionality to be included on the media capture device, thereby avoiding the requirement for dedicated software on a data transfer (or pipeline) device, such as a cellular phone. Requiring dedicated software on the pipeline device limits the types of pipeline devices that can be utilized with particular media capture devices. As long as there is a correct interface between the media capture device and the pipeline device, all the necessary transfer functionality can be included in the media capture device. For example, a digital camera including the transfer device can be connected to any data call capable cellular phone without requiring the installation of decided software on the cellular phone.

Another benefit of the present invention is that information may be transferred from the media capture device rather than merely copied to the server. The present invention provides verification that a transfer has been successfully completed, and, therefore, the user does not need to retain a copy locally. This is a considerable benefit as it as enables memory to be freed up on the media capture device. For example, in the case of the digital camera, a digital image on the camera can be deleted once the transfer of such image is confirmed, thereby enabling the user to take additional pictures.

BRIEF DESCRIPTION OF THE DRAWINGS

FIG. 5 illustrates the actions of the transfer status light and the transfer failure light of the transfer device in response to certain events.

DETAILED DESCRIPTION OF A PREFERRED EMBODIMENT

The following description will focus on the presently preferred embodiment of the present invention, which operates in an environment typically including a variety of computing or information-storing devices (e.g., desktop computers, server computers, and portable computing devices) that are capable of hosting other devices (e.g., digital camera) via a temporary or permanent connection. In particular, the following description focuses on an embodiment of the present invention in a digital camera device, the currently preferred embodiment, which may be occasionally connected to a multitude of different "host" devices, such as a Palm™ handheld computer or a cellular phone. However, those skilled in the art will appreciate that the present invention may be embodied in practically any device that is intended to be connected to another device (or devices). Further, the description focuses on implementation of portions of the invention in a connected environment including computers, such as an IBM-compatible computer running under MICROSOFT® Windows XP, with Internet support. The present invention, however, is not limited to any particular one application or any particular environment. Instead, those skilled in the art will find that the system and methods of the present invention may be advantageously embodied on a variety of different platforms, including Macintosh, Linux, BeOS, Solaris, UNIX, NextStep, and the like, as well as special-purpose operating systems (e.g., digital camera operating systems). Therefore, the description of the exemplary embodiments that follows is for purposes of illustration and not limitation.

I. Basic System

A. Digital Camera Hardware

Figure 1A:
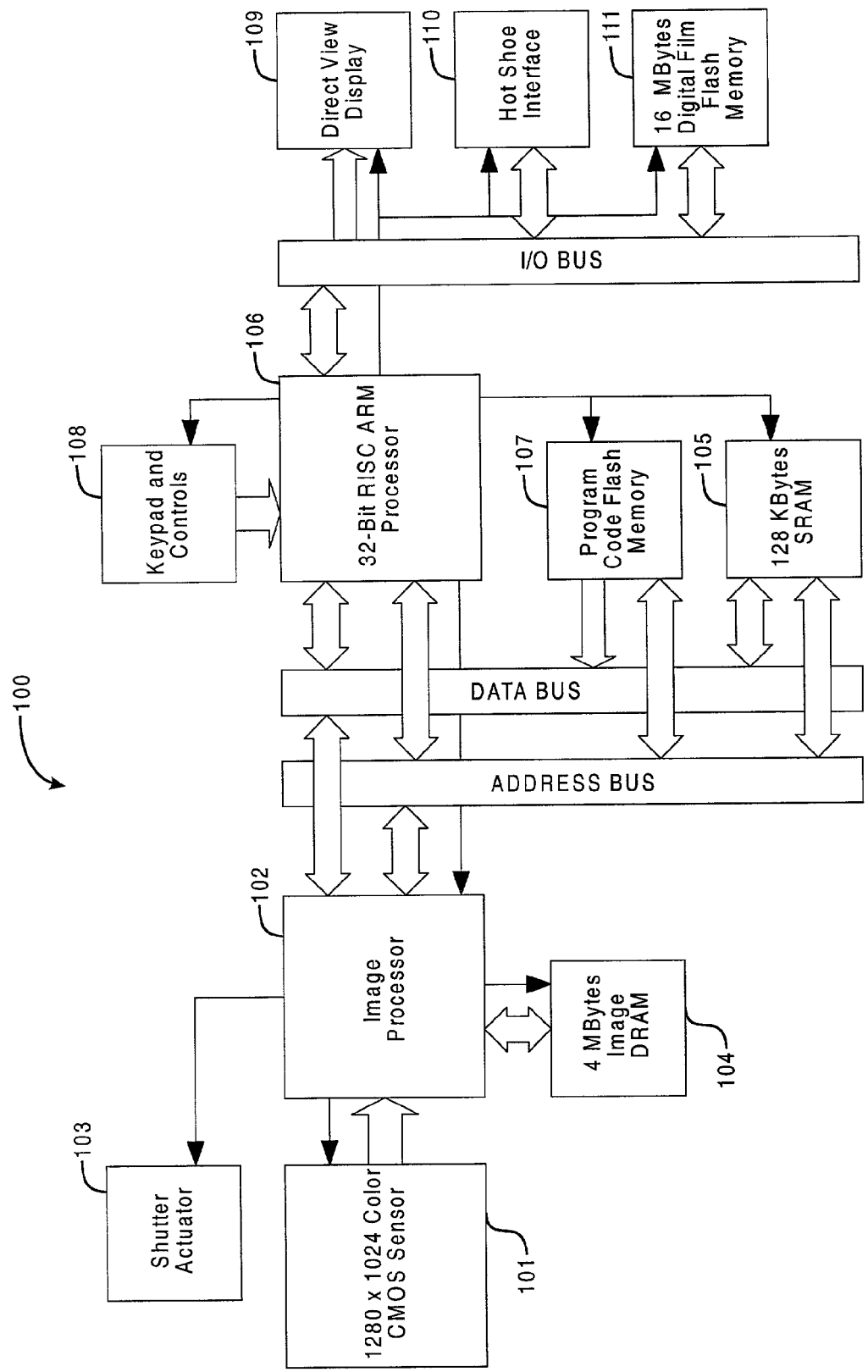
FIG. 1A is a block diagram illustrating a basic image capturing and recording system suitable for implementing a portion of the present invention.

FIG. 1A is a block diagram illustrating a basic media capturing and recording system 100 suitable for implementing a portion of the present invention pertaining to initial media capture (e.g., capture of digital media), which then may be transmitted to a host system (e.g., computer system) using wireless or wire-line technique. For purposes of illustration, the following will focus on implementation of the system 100 as a digital camera. However, as noted above, for purposes of implementing the methodology of the present invention, the system 100 may also be implemented in a variety of other media or data capture devices.

As shown in FIG. 1A, the system 100 includes a Sensor 101, a Shutter Actuator 103, an Image Processor 102, an Image (DRAM) Memory 104, a (Central) Processor 106, a Keypad and Controls 108, a Program Code Flash Memory 107, a (System) Memory 105, a Direct View Display or Viewfinder 109, a Hot Shoe Interface 110, and a "Digital Film" Flash Memory 111. As illustrated, these various components communicate with one another using a bus architecture including, for instance, an Address Bus, a Data Bus, and an I/O (Input/Output) Bus.

The system 100 employs the Sensor 101 for basic image capture. The Sensor 101 operates, in essence, by capturing light and transforming that into electrical voltage levels. A suitable sensor is available from a variety of vendors, including VLSI Vision, Motorola, and Toshiba. In a preferred embodiment, the Sensor 101 includes, for example, a 1280× 1024 color CMOS sensor, such as a VLSI Vision VVL 6801 CMOS sensor. However, other sensor technology is suitable, including CCD sensors.

The Sensor 101 must, of course, be part of a larger assembly to operate. Specifically, the Sensor 101 operates in conjunction with a lens assembly (not shown), or other optics to focus an image onto the sensor. The optics themselves are controllable, for instance, using a conventional aperture, focus, and shutter control mechanisms. The currently preferred embodiment uses an 18 mm fixed-focal length, fixed-aperture lens assembly to provide a broad depth of field. The lens assembly employs two manual slide controls, a macro lens control, and an exposure control. The macro lens control switches from normal to close-up mode by sliding a macro lens in and out of the lens assembly to provide normal or extreme close-up capability. The exposure control switches from normal to bright light by sliding a neutral gray filter in and out of the lens assembly. Aside from choosing normal or bright light, normal or close-up mode, the camera requires no manual focusing, shutter speed, or aperture adjustment. Operation is as simple as point and shoot. The Sensor 101, on the other hand, operates under the control of the Image Processor 102, which will now be described.

The Image Processor 102, which basically operates as a state machine, provides overall control for the Sensor 101. In operation, the Image Processor 102 controls the Sensor 101 by, in effect, telling it what to do and when. For instance, the Image Processor 102 issues timing signals to the Sensor 101 for indicating how the Sensor 101 should record and stream out image data. Further, the Image Processor 102 provides general Input/Output (I/O) control that allows one to coordinate control of the sensor with other electromechanical peripherals, such as a shutter, lens aperture, or the like.

Actual implementation of the Image Processor 102 itself may be accomplished in a variety of different ways. For a microprocessor-based implementation, for instance, the Image Processor 102 may be implemented as a microprocessor (e.g., PowerPC 823 microprocessor, available from Motorola, Inc. of Schaumburg, Ill.) with DSP (digital signal processing) logic blocks, memory control logic blocks, video control logic blocks, and interface logic. Alternatively, the Image Processor 102 may be implemented as a "camera on a chip (set)" using, for instance, a Sierra Imaging Raptor I or II chipset (available from Sierra Imaging, Inc. of Scotts Valley, Calif.), a Sound Vision Clarity 1 or 2 chipset (available from Sound Vision, Inc. of Framingham, Mass.), or similar chipset that integrates a processing core with image processing periphery. In a preferred embodiment, the Image Processor 102 preferably supports hardware implementation of a wavelet-transform engine complete with a wavelet-transform filter bank, so that the wavelet-transform process may be pipelined through a series of dedicated hardware gates (instead of executed as a sequence of software instructions repeatedly loaded and processed by a general-purpose microprocessor).

The Image Processor 102 is not a stand-alone part but, instead, relies on the (Central) Processor 106 for control instructions. The Image Processor 102 sits on the address and data buses and is accessible by the Processor 106 through a series of registers. In this manner, the Processor 106 may instruct the Image Processor 102 what to perform and when. For instance, the Processor 106 may instruct the Image Processor 102 to turn on the Sensor 101, to capture an image at the Sensor 101, and to execute the wavelet transform. Therefore, the Image Processor 102 is very much a facilitator but is not in and of itself a controller for the system.

The Shutter Actuator 103 is a simple, generic component for controlling light exposure on the Sensor 101. Depending on the behavior of the actual sensor employed, the Shutter Actuator 103 may not even be necessary. In particular, the Shutter Actuator 103 is employed in those instances where the Sensor 101 requires a black reference. In such an embodiment, the Shutter Actuator 103 is an electromechanical interface coupled to a solenoid which, when the interface responds to a particular logic level, triggers an open/close cycle of a mechanical shutter. The mechanical shutter, which serves to selectively block light entering the lens assembly of the camera, may be of a conventional design available from a variety of suppliers. A suitable supplier includes, for instance, Sunex, Inc. of Carlsbad, Calif.

The Image Memory (DRAM) 104 serves to store the image captured from the Sensor 101. The Sensor 101 itself does not "store" image that it captures. Therefore, the Image Memory 104 is an image-capture and in-place transform (frame) buffer. This memory is controlled by the Image Processor 102 and can be shut off when not in use for power-saving purposes. During basic operation of the camera, the captured image is transferred directly into the Image Memory 104, using a sample/transfer technique. In order to make this efficient, the process is controlled by the Image Processor 102 in a manner somewhat akin to DMA (direct memory access) transfer employed on desktop computers. Here, the Image Processor 102 functions as a state machine which simply samples and transfers information from the Sensor 101 to the Image Memory 104. In the presently preferred embodiment, the Image Memory 104 comprises conventional DRAM (dynamic random-access memory) memory available from a variety of vendors, including, for instance, Toshiba, Micron, Hitachi, Samsung, and others. A size of about 4 MB (megabyte) or more is suitable for this component.

The next several components discussed, which may be viewed as components hanging off of the Address and Data Buses of the Processor 106, are typical components that one would ordinarily expect to find when implementing a data processing device; collectively, these components may be viewed as a computer embedded in the camera. For example, these components include the previously mentioned general-purpose microprocessor (Processor 106) coupled to memory (System Memory 105 and Program Code Flash Memory 107). The Working or System Memory 105 is the general working or scratchpad memory for the Processor 106. This memory is used for storing program-created variables, stacks, heap(s), and the like. In the presently preferred embodiment, the System Memory 105 comprises static RAM (e.g., SRAM), which is also available from a variety of vendors. A size of about 128 KB (kilobyte) or more is suitable for this purpose. The Program Code Flash Memory 107, on the other hand, comprises 1 MB of directly-addressable flash storage that holds the operating system and embedded software, that is, the program code comprising the instructions that the processor must execute to operate. The flash memory, which may be conventional flash memory that is available from a variety of vendors, need not be of the removable type, as the Program Code Flash Memory 107 is not intended to be removed from the system by the camera user.

The Processor 106 itself, in the presently preferred embodiment, comprises a 32-bit RISC ARM Processor designed by ARM Limited of Maidenhead, UK. ARM licenses its designs to semiconductor partners for manufacture, supply, and support. The ARM processor has an efficient instruction set that is ideal for performing cyclical functions quite rapidly and includes sufficient bandwidth for transferring large amounts of data quickly (e.g., for performing Huffman coding on a large amount of data). Additionally, the processor is a dedicated processor, without the overhead of a substantial number of peripherals. These features make the processor attractive for use in a digital camera embodiment.

For a camera embodiment, the client device may include its own interface that is capable of receiving input from users and/or may share these elements with a hosting device (e.g., PDA) as described below. Keypad and Controls 108 are conventional inputs that support user input. Similarly, the Direct View Display ("Viewfinder") 109 is a direct view LCD (liquid crystal display) that provides feedback to the user or camera operator. During photography mode, the Viewfinder 109 replaces the plastic viewfinders and LCD panels found on most digital cameras and provides the most accurate real-time representation of the scene visualized by the sensor. The Viewfinder 109 overlays simple icons onto the image to indicate the status of various camera settings. The Viewfinder 109 fits inside an eyepiece which keeps sunlight out and allows the operator to visualize the scene in any lighting conditions. During preview mode, the Viewfinder 109 shows previews of the captured photos and allows the operator to delete unwanted photos or tag photos for wireless transmission. Thus for a camera embodiment, the Viewfinder 109 is used to provide a representation of the image that is being captured, in preview and/or post-capture fashion.

In order to provide the display image to the Viewfinder 109, the Sensor 101 is subsampled at a rate to create a version of the image appropriate for display. During preview processing, the system continuously captures the sensor mosaic and sub-samples the resulting mosaic for preview purposes. A histogram of the sampled luminosity is fed into a "linearization" filter to produce a balanced dynamic range for best optical perception. The scaled and "linearized" image is then displayed on the viewfinder module. The histogram data is then adjusted to match the preview image for use in linearizing the next image. The cycle is repeated continuously to provide a real-time viewfinder mechanism. The Viewfinder 109 itself typically operates in conjunction with a display controller and a frame buffer (not shown), both of which may be integrated within the display component itself.

Both the Keypad and Controls 108 and Direct View Display 109 components, which may be conventional in nature, interface directly with the Processor 106 through general I/O (e.g., I/O Bus). Typically, such devices communicate with the microprocessor through means of interrupt requests (IRQ). Both the Keypad and Controls 108 and Direct View Display 109 components are available from a variety of vendors. Examples include Sharp, Toshiba, and Citizen of Japan, Samsung of South Korea, and Hewlett-Packard of Palo Alto, Calif. More customized displays are available from Displaytech, Inc. of Longmont, Colo. For an embodiment that does not need to interact with users, such as a surveillance camera, the foregoing components may be eliminated.

Additionally for a camera embodiment, it is desirable for the device to include an interface for standard peripheral devices, such as a detachable flash device. This may be provided by Hot Shoe (Accessory) Interface 110, which is a general I/O port that may comprise a serial interface of a conventional design that the camera uses to interface to its accessories via the Hot Shoe Interface 110. In this manner, a flash accessory can be clipped onto the camera via the Hot Shoe Interface 110 for added illumination.

The Hot Shoe Interface 110 combines a Serial Peripheral Interface (SPI) with a multiplexed I/O bus which provides a plug-and-play interface to a family of accessories. These accessories may include, in addition to a flash unit, a wireless holster for cellular phones (e.g., available from Motorola, Nokia, Ericsson, and Samsung), extra film backs for compatibility with format digital film (e.g., Sony Memory Stick or SmartMedia), a USB cradle, an RJ-11 modem cradle, a wireless cellular module, extender cables, and the like. In the currently preferred embodiment, the interface is based on the I2C-standard serial interface, which supports logic allowing the device to sense I2C-compatible devices that are attached to the port. I2C, which stands for Inter IC Communication, is a serial bi-directional communication protocol created by Philips Semiconductor (subsidiary of Philips Electronics, based in The Netherlands) and is used for communication between integrated circuits. Most systems have one master and several slaves that communicate using only two wires. Every device has its own identification code. If that code is sent by the master only that device will respond with an acknowledgement. After the acknowledgement, the data to be communicated is sent or received by the master. Further information about the I2C communication protocol is available from Philips Electronics of The Netherlands. As with the Keypad and Controls 108 and Direct View Display or Viewfinder 109, the Hot Shoe Interface 110 itself is not required for implementing the image capturing and processing methodology of the present invention. In the specific embodiment of a consumer product such as a camera, though, these components typically would be included.

The system includes Digital Film Flash Memory 111, which serves as the "digital film" for the system for storing compressed images. The Flash Memory 111 may comprise available flash memory removable media, such as Compact-Flash, DataFlash, and Sony Memory Stick, typically in a 16 MB or larger size. Available vendors for flash memory include, for example, SanDisk of Sunnyvale, Calif. or Sony of Japan. Alternatively, the Flash Memory 111 may be affixed directly (i.e., non-removable) to the system 100. In such an embodiment, the additional bulk associated with a removable media cartridge holder and its accompanying interface may be avoided. Those skilled in the art will appreciate that the system 100 may incorporate other non-volatile memory configurations and designs that readily accommodate the image capture and processing methodology of the present invention. In general, for a consumer device embodiment, one should choose media that accommodates on the order of 100 compressed images or more.

The camera embodiment is powered by a single CR-123 lithium battery (not shown), provided with instant-on capability. Due in part to the distributed image processing approach of the present invention (presented below), the camera has significant power savings over other camera designs. This gives the device not only a size and weight advantage over other cameras but also a battery life advantage.

For connectivity, the system includes a wireless holster, a USB cradle, and a modem cradle. The wireless holster physically connects the camera to a cellular phone (e.g., Motorola StarTAC cellular phone) and interfaces the Hot Shoe Interface 110 to the phone's external accessory plug. The camera can be easily pulled out of the holster for use and clipped back in for transmission. Detection of the holster and phone signal is automatic to allow for hands-free transmission and there is no risk of corruption due to interruption by either loss of signal or unclipping. The camera clips into the USB cradle through the Accessory Hot Shoe Interface 110 to provide rapid photo interchange to a personal computer equipped with a standard USB port. The USB cradle acts a USB slave device and therefore requires no batteries or power supply for operation and instead draws its power from the PC. The camera can also clip into a modem cradle through the Hot Shoe Interface 110. The modem cradle allows the camera to transmit images to a remote server (e.g., PhotoServer) via a landline connection (e.g., 33.6 KBps) via a standard RJ-11 phone jack. The modem cradle is powered by the battery in the camera.

Further description of the system 100 may be found in the above-mentioned commonly-owned application Ser. No. 09/434,703. The above-described system 100 is presented for purposes of illustrating the basic hardware underlying a client device (e.g., wireless digital camera) that may be employed in the system of the present invention. The present invention, however, is not limited to just digital camera devices but, instead, may be advantageously applied to a variety of user-operated devices capable of participating and/or benefiting from the methodologies of the present invention presented in detail below.

B. Basic Computer Hardware for a Sample Host (e.g., Desktop Computer, Server Computer, or Other Computing Device)

Figure 1B:
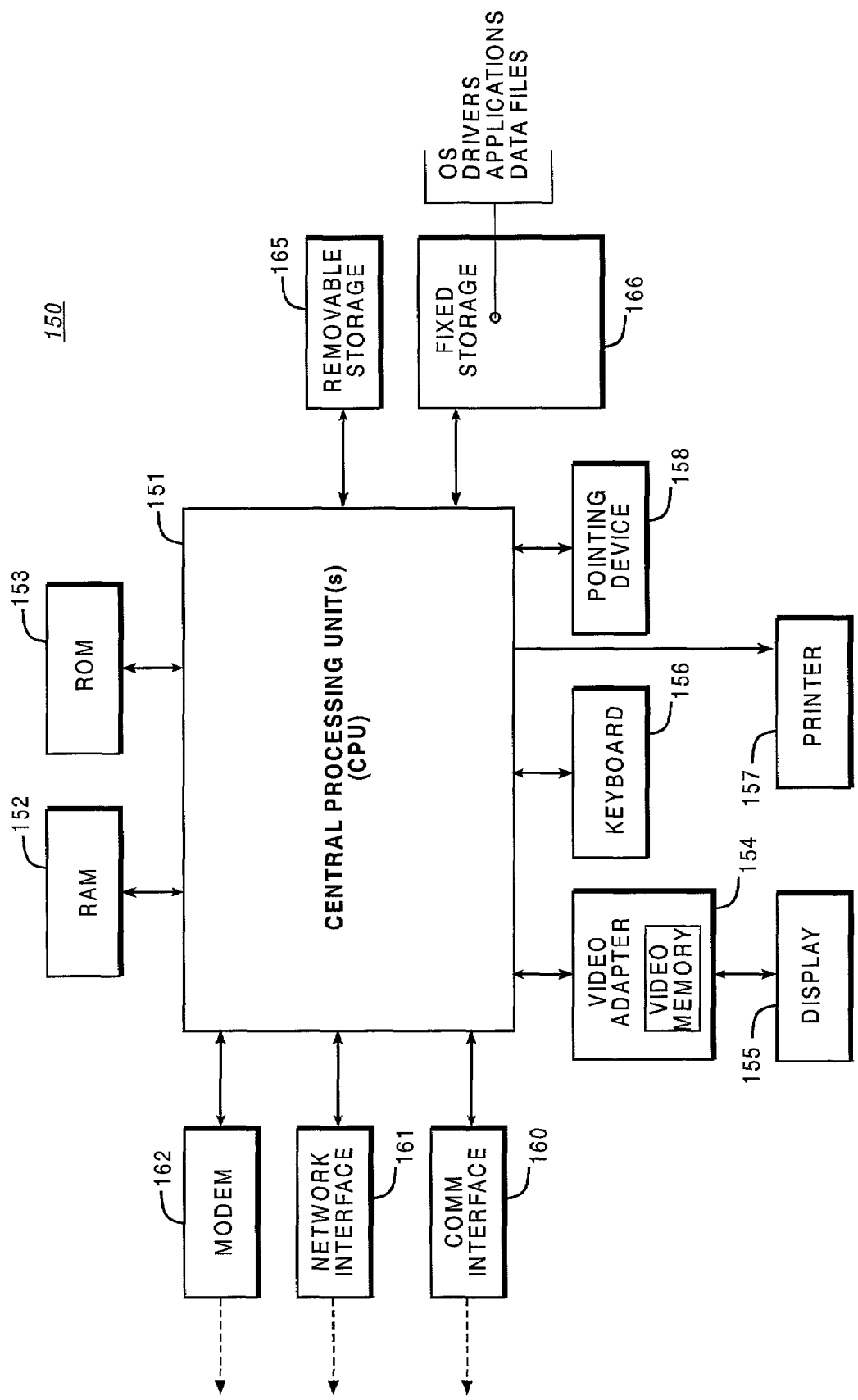
FIG. 1B is a block diagram of a computer system in which software-implemented processes of the present invention may be embodied.

Portions of the present invention may be implemented on a conventional or general-purpose computing device, such as an IBM-compatible personal computer (PC) or server computer that may host the above-described client (digital camera) device, such as via USB or RS-232 connectivity. FIG. 1B is a very general block diagram of an IBM-compatible system 150. As shown, system 150 comprises a central processor unit(s) (CPU) 151 coupled to a random-access memory (RAM) 152, a read-only memory (ROM) 153, a keyboard 156, a pointing device 158, a display or video adapter 154 connected to a display device 155, a removable (mass) storage device 165 (e.g., floppy disk), a fixed (mass) storage device 166 (e.g., hard disk), a communication port(s) or interface(s) 160, a modem 162, and a network interface card (NIC) or controller 161 (e.g., Ethernet). Although not shown separately, a real-time system clock is included with the system 150, in a conventional manner.

CPU 151 comprises a processor of the Intel PENTIUM® family of microprocessors. However, any other suitable microprocessor or microcomputer may be utilized for implementing the present invention. The CPU 151 communicates with other components of the system via a bi-directional system bus (including any necessary I/O controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 152 serves as the working memory for the CPU 151. In a typical configuration, RAM of sixteen megabytes or more is employed. More or less memory may be used without departing from the scope of the present invention. The read-only memory (ROM) 153 contains the basic input/output (I/O) system code (BIOS)—a set of low-level routines in the ROM that application programs and the operating systems can use to interact with the hardware, including reading characters from the keyboard, outputting characters to printers, and so forth.

Mass storage devices 165, 166 provide persistent storage on fixed and removable media, such as magnetic, optical or magnetic-optical storage systems, flash memory, or any other available mass storage technology. The mass storage may be shared on a network or it may be a dedicated mass storage. As shown in FIG. 1B, fixed storage 166 stores a body of program and data for directing operation of the computer system, including an operating system, user application programs, driver and other support files, as well as other data files of all sorts. Typically, the fixed storage 166 serves as the main hard disk for the system and stores system and application software.

In basic operation, program logic (including that which implements methodology of the present invention described below) is loaded from the storage device or mass (fixed) storage 166 into the main (RAM) memory 152, for execution by the CPU 151. During operation of the program logic, the system 150 accepts user input from a keyboard 156 and a pointing device 158, as well as speech-based input from a voice recognition system (not shown). The keyboard 156 permits selection of application programs, entry of keyboard-based input or data, and selection and manipulation of individual data objects displayed on the display device 155. Likewise, the pointing device 158, such as a mouse, track ball, pen device, or the like, permits selection and manipulation of objects on the display device 155. In this manner, these input devices support manual user input for any process running on the system.

The computer system displays text and/or graphic images and other data on the display device 155. Display device 155 is driven by the video adapter 154, which is interposed between the display device 155 and the system 150. The video adapter 154, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system 150, may be obtained from the printer 157, or other output device. The printer 157 may include, for instance, an HP LASERJET® printer (available from Hewlett-Packard of Palo Alto, Calif.), for creating hard copy images of output of the system.

The system itself communicates with other devices (e.g., other computers) via the network interface card (NIC) 161 connected to a network (e.g., Ethernet network), and/or a modem 162 (e.g., 56K baud, ISDN, DSL, or cable modem), examples of which are available from 3Com of Santa Clara, Calif. The system 150 may also communicate with local occasionally-connected devices (e.g., serial cable-linked devices) via the communication ("comm") interface 160, which may include an RS-232 serial port, a Universal Serial Bus (USB) interface, or the like. Devices that will be commonly-connected locally to the comm interface 160 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

As in the case of the example client device (i.e., system 100), the above-described system 150 is presented for purposes of illustrating the basic hardware underlying desktop and server computer components that may be employed in the system of the present invention. For purposes of discussion, the following description will present examples in which it will be assumed that there exists a "server" (e.g., Web server) that communicates with one or more "clients" (e.g., media-capturing devices). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

C. Basic System Software

Figure 2:
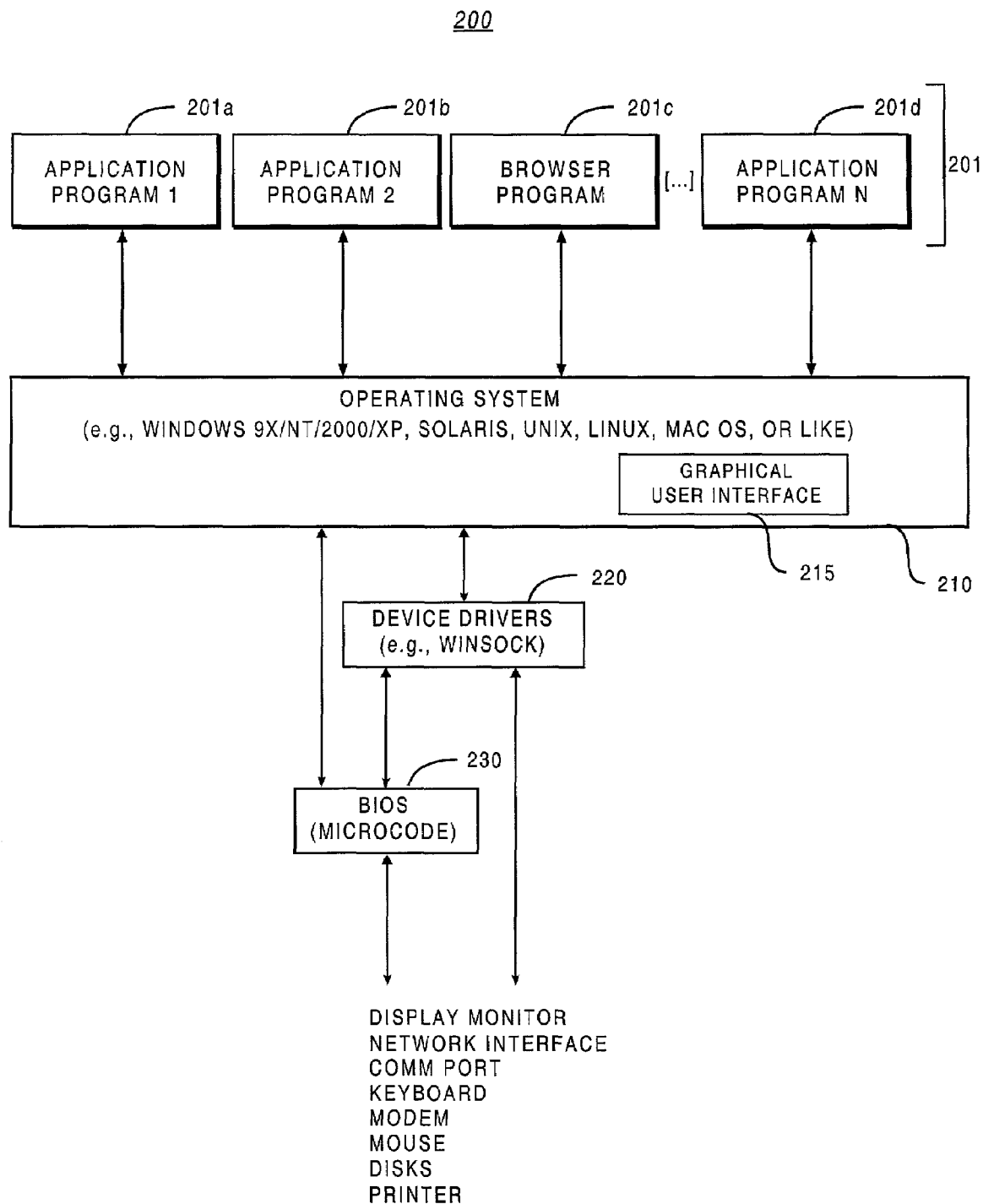
FIG. 2 is a block diagram of a software system for controlling the operation of the computer system.

Illustrated in FIG. 2, a computer software system 200 is provided for directing the operation of the computer system 150. Software system 200, which is stored in system memory (RAM) 152 and on fixed storage (e.g., hard disk) 166, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d), including browser and image processing software, may be "loaded" (i.e., transferred from fixed storage 166 into random-access memory 152) for execution by the system 150.

Software system 200 includes a graphical user interface (GUI) 215, for receiving user commands and data in a graphical (e.g., "point-and-click") fashion. These inputs, in turn, may be acted upon by the system 150 in accordance with instructions from operating system 210 and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as MICROSOFT® Windows 9x, MICROSOFT® Windows NT, MICROSOFT® Windows 2000, or MICROSOFT® Windows XP, all available from Microsoft Corporation of Redmond, Wash. Alternatively, OS 210 can also be an alternative operating system, such as the previously-mentioned operating systems.

The above-described hardware and software are presented for purposes of illustrating the basic underlying components that may be employed for implementing "client" and "host" portions of the present invention. For purposes of discussion, the following description will present examples in which it will be assumed that there exists a "host" (e.g., PDA, PC, server, microprocessor-enabled cell phone, or the like) that communicates with a "client," such as wireless or wire-line digital camera devices or other client (i.e., user-operated) media or data capture device. The present invention, however, is not limited to any particular environment or device configuration. In particular, a client/host or hosted/hosting distinction is not necessary to the invention, but is used to provide a framework for discussion. Instead, the present invention may be implemented in any type of system architecture or processing environment capable of supporting the methodologies of the present invention presented in detail below.

II. Device for Efficient Transfer of Digital Content from Media Capture Device

A. Overview

The following discussion illustrates the operation of the present invention, using as an example the transfer of digital images from digital camera, directly or indirectly through a pipeline device (such as a cellular telephone), to a larger host device such as a computer server. However, the present invention is not limited to use with digital cameras, and those skilled in the art will appreciate that the present invention may be used with a number of other data and media capture devices. These media and data capture devices (referred to in this document generally as "media capture devices") include digital cameras, digital video recorders, digital audio recorders, personal digital assistants, and the like.

Media capture devices are typically portable devices with limited resources in terms of processing power, memory, and storage capacity. Accordingly, a user of this type of device will frequently wish to transfer information from his or her media capture device to a larger device to facilitate storing, editing, sharing, or printing such information. The transfer also enables the user to free up memory on the media capture device. For example, in the case of digital cameras, after a user has taken several pictures (i.e., digital images), he or she may wish to transfer those images to a local or remote server through some sort of wireless or wireline connection. The user may be at home and wish to transfer the images over a wireline USB connection to his or her home computer. Alternatively, the user may be traveling and may seek to wirelessly transfer the images through an intermediary "pipeline" or "data transfer" device, such as a cellular telephone, to a remote server.

This transfer of data from a media capture device to a larger device involves several steps, each of which needs to take place in order to effectively transfer information from the media capture device. For example, the steps that need to take place to transfer a file (or object) from a media capture device to a remote server over the Internet are as follows:

1. Connecting the media capture device (directly or through a pipeline device) to the Internet;
2. Selecting the files or objects to be moved (transferred) from the media capture device (including automatic selection of files or objects on the device by default);
3. Confirming that a connection to the remote server has been established;
4. Verifying that files or objects are in process of being transferred;
5. Being informed of problems or events that may impede the transfer; and
6. Receiving notification when files or objects have been successfully transferred.

Upon completion of all the above steps, including confirmation that particular files or objects have been successfully transferred, the user is free to remove those files or objects from storage on the media capture device, thereby creating room for additional files or objects. Until each of these steps is completed, the user may not remove the files or objects from his or her media capture device without risking loss of this information. The presently preferred embodiment of the present invention provides for files or objects to be automatically deleted from the media capture device once verification of successful transfer is received. This provides the user with the ability to move or transfer objects from the media capture device rather than to merely copy them to the server.

During the process of transferring information there are a number of events relating to the status of the transfer that the user of the media capture device would like to be made aware of. For example, the user would like to know that a connection has been established, that files are in process of being transferred, that something has happened to disrupt or impede the transfer, or that the transfer has been successfully completed. This feedback enables the user to take some action in response to the information received, such as attempting to re-establish a connection or, alternatively, waiting and resending the items at a later time.

The present invention simplifies the transfer of information from a media capture device to a larger device while also providing the user with valuable feedback about the status of the transfer. The transfer device of the present invention includes a simple user interface that can be easily implemented on the media capture device to facilitate the transfer of information. The present invention provides the media capture device user with the ability to initiate a transfer. The user is also provided with feedback about the status of a transfer operation, enabling the user to take action when necessary. In the currently preferred embodiment, feedback is provided to the user visually. The visual feedback may also be accompanied by audible clues in response to user actions or events. The end user is informed that the transfer has been completed or, alternatively, that it has failed and needs to redone. In the presently preferred embodiment, "transfer" of objects (or files) includes sending such objects to the remote server, receiving confirmation of successful receipt by the remote server, and automatically deleting the local copies of the objects on the media capture device.

The transfer device provides all feedback to the user locally on the media capture device. One advantage of providing all of the feedback locally on the media capture device is to enable the device not to be dependent on the availability of specific software on other devices. Using the present invention, as long as there is a correct interface between the media capture device and the data transfer (or pipeline) device, all the necessary transfer functionality can be included in the media capture device. Thus, the installation of additional software on the pipeline device is not required in order for the pipeline device to serve as a conduit for the transfer of information. For example, a digital camera including the transfer device can be connected to any data call capable cellular phone, without requiring the installation of dedicated software on the cellular phone. This greatly increases the number of data transfer devices that can be utilized with particular media capture devices.

The transfer device of the present invention is also configurable, so that the media capture device will know where to send the files or objects, how to initiate a data call, and other details necessary to complete the data transfer with minimal user action. This considerably simplifies the data transfer process. For example, a digital camera including the transfer device can be pre-configured to transfer data in a particular manner to a particular Internet site or server or to a particular telephone number. A registry setting in the media capture or transfer device operates in a manner similar to a typical cellular phone in directing the media capture device to connect to a particular network to initiate communication. The transfer device may also include a unique identifier so the server can determine where to store the information received.

B. Operations of the Transfer Device

For purposes of the following discussion, a digital camera is used as an example to illustrate the operations of the present invention. However, as previously described, the present invention can also be used with any number of other types of data or media capture devices able to capture, create, or hold files or objects. A media capture device also typically includes means to connect to some sort of transport device or pipeline for purposes of transferring information. The method of transport may include a hardwire connection such as a cable that directly connects the media capture device to a computer server. Alternatively, the media capture device may be connected to a cellular telephone or another device that acts as a pipeline for connecting the media capture device to the Internet.

Figure 3:
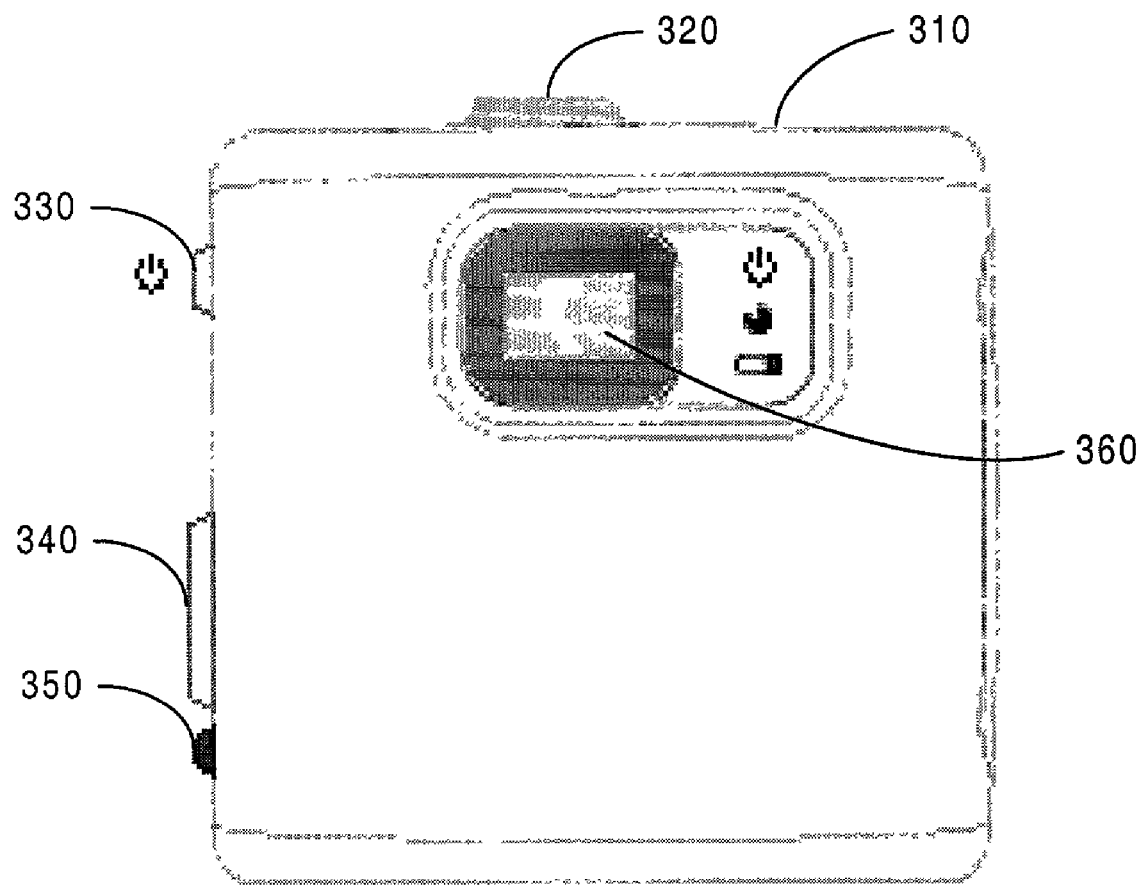
FIG. 3 is a block diagram of a digital camera in which the transfer device of the present invention may be embodied.

In this exemplary implementation, the media capture device is a digital camera that captures and stores digital images. An illustration of a digital camera in which the present invention may be embodied is shown at FIG. 3. FIG. 3 provides a rear view of a digital camera 300. Digital camera 300 includes a body housing 310, a shutter button 320, a power button 330, a transfer button 340, a transfer failure light 350, and a viewfinder 360, all as shown at FIG. 3. Each of these components will now be described in greater detail.

Power button 330 turns the camera on and off. Shutter button 320 is depressed by a camera user to capture an image (i.e., take a picture). Viewfinder 360 is a standard device that a camera user looks through to frame a picture. Viewfinder 360 may also show previews of the captured photos and allow the user to delete unwanted photos or tag photos for wireless transmission. The viewfinder 360 provides a representation of the image that is being captured, in preview and/or post-capture fashion. When the camera power button 330 is turned on, a user can look through the viewfinder 360 and depress shutter button 320 to capture an image. Digital camera 300 also includes one or more connectors (not shown) that enable the camera to be connected to a transport device. The transport device may be a cable, a data capable cellular telephone, or another device as previously described.

The transfer device of the present invention includes a transfer button 340, a transfer status light (not separately shown) that is included as part of transfer button 340 in the presently preferred embodiment, and a transfer failure light 350. Transfer button 340 and transfer failure light 350 are shown at the left side of FIG. 3. Transfer failure light 350 is immediately below transfer button 340. Transfer button 340 is used to initiate a transfer of files or objects from a media capture device (e.g. camera) to a server or another end destination. Although the transfer status light is included on the transfer button 340 in the presently preferred embodiment, the transfer status light may alternatively be implemented as a separate light located near the transfer button 340.

The transfer status light may be implemented as a light or, alternatively, as an icon or text that is displayed through a window (e.g. a liquid crystal display) to the device user. In the presently preferred embodiment, the transfer status light is a green light (LED) that is physically included as part of transfer button 340. The transfer light is green (i.e., illuminated) and steady prior to initiation of a transfer if objects are on the media capture device and the device is connected to a server or pipeline device. The transfer status light blinks intermittently while a transfer is proceeding. The transfer status light is off (i.e., not illuminated) when no data (e.g. images) is on the media capture device or in the event the media capture device is not connected to another device. The transfer status light also shuts off in the event of failure of a transfer operation.

As shown in FIG. 3, transfer failure light 350 is a separate light adjacent to transfer button 340 that is illuminated to indicate a problem with a transfer operation. In the presently preferred embodiment, transfer failure light 350 is a red light (LED) that is illuminated in the event of a problem with a transfer of objects or files from the camera. The transfer failure light is off (i.e., not illuminated) if a transfer is proceeding successfully.

C. Use Transfer Device to Facilitate Transfer of Digital Content

Figure 4:
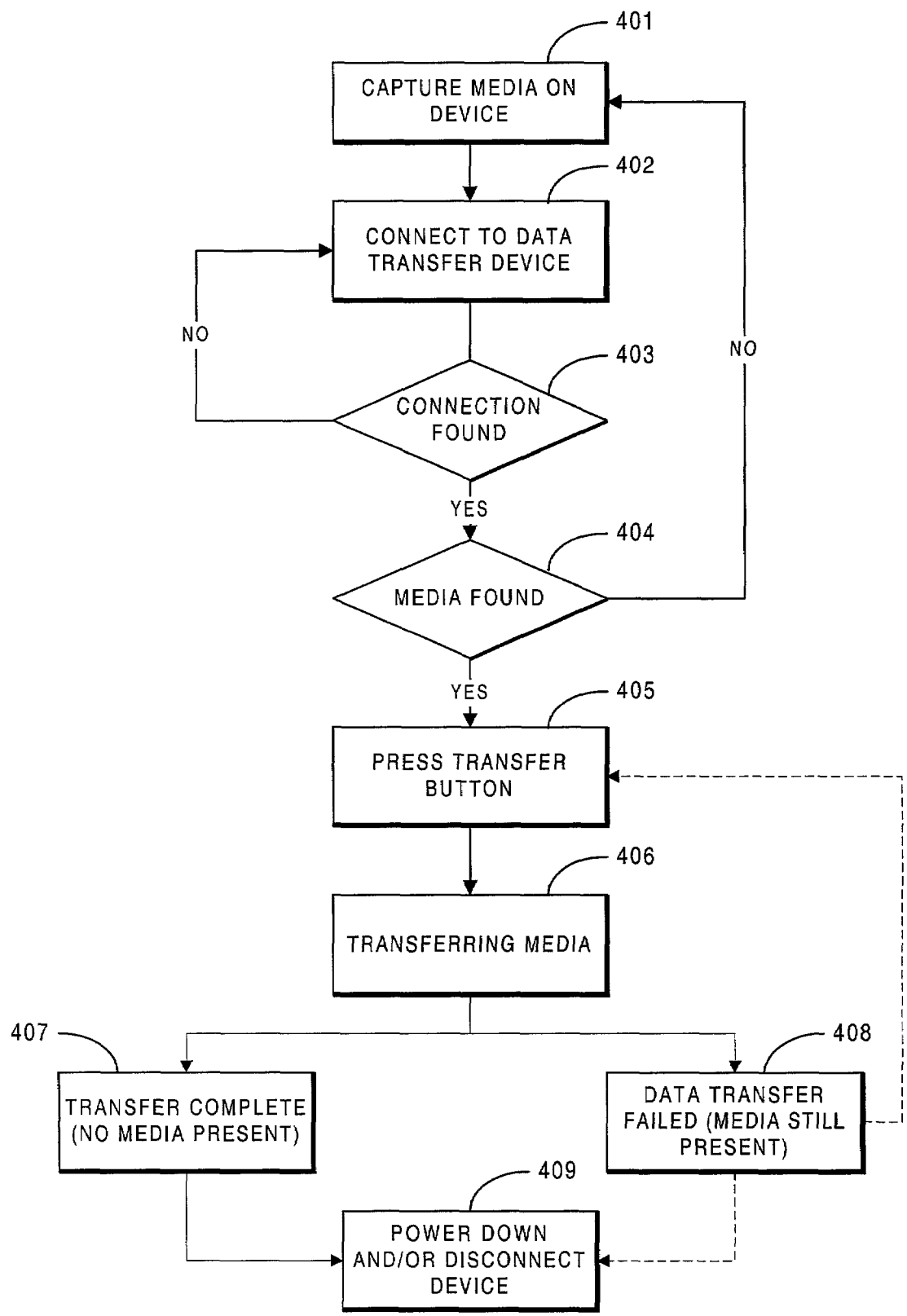
FIG. 4 is a flowchart illustrating the detailed method steps of the operations of the transfer device in transferring data from a media capture device to a larger device.

A user often wishes to transfer objects captured or stored on his or her media capture device to a server for storing, printing, sharing, editing, or otherwise using such objects. For example, a digital camera user may wish to upload digital images from his or her digital camera via the Internet to a remote computer server. FIG. 4 is a flowchart illustrating the detailed method steps of the operation of the transfer device of the present invention in connection with the transfer of information from a media capture device (in this example, a digital camera) to a computer server via the Internet.

As a pre-requisite to transferring information from the media capture device, a user first captures or stores media or other objects on the media capture device. Accordingly, the process begins, at step 401, with the capture of media on the media capture device. The user then must establish a connection between the media capture device and another device to facilitate the transfer. Accordingly, at step 402, the user establishes a physical connection between the media capture device and a data transfer or pipeline device. In this example, the user connects his or her digital camera to a data capable cellular phone using the connector jacks of the two devices. A physical connection may also be accomplished by other means to other devices. The user must also turn on the power switch on the camera (and on the data transfer device) before proceeding.

Prior to initiating a transfer, at step 403, a verification is made as to whether or not a good physical connection has been established between the camera and the data transfer (or pipeline) device. This step does not confirm that a connection has been made to a remote server, rather it only verifies that an effective connection has been made between the media capture device and the pipeline device. The transfer status light is not illuminated until verification is made of an effective connection to another device.

At step 404, a determination is made as to whether or not media or other objects are stored on the media capture device. If a connection has been established at step 403 and media objects (e.g. digital images) are found on the media capture device at step 404, the transfer status light is illuminated. For example, if a digital camera is connected to a cellular phone, the transfer status light is illuminated after verification that an effective connection has been established and that the camera contains digital images. In the currently preferred embodiment, the transfer status light is green and steady indicating that a transfer may be initiated. The steady green light indicates to the user that objects (e.g. digital images) were found on the device, that a connection has been established, and that he or she may proceed to initiate the transfer. On the other hand, if no pictures have been taken or if a connection has not been established, neither the status light nor the failure light will be illuminated. In this situation, the user would need to repeat steps 401 and/or 402 before proceeding.

If the transfer status light is green and steady, the user may depress the transfer button to initiate a transfer. At step 405, pressing the transfer button initiates a connection to the remote server and starts the process of transferring the files from the media capture device to the remote server. In this example, digital images are transferred from the camera one image at a time through a connected cellular phone wirelessly to an Internet server. The specific details of an exemplary transfer operation involving the transfer of digital images through a data capable cellular phone to a remote server are described in more detail below.

While a transfer operation is taking place, at step 406, the transfer status light blinks on and off to indicate that the transfer is in process. The blinking status light indicates to the user that the transfer of pictures from the camera to the remote server is proceeding successfully. In the event of a lost connection or another problem, the status light returns to a steady green state to indicate that pictures (digital images) remain on the camera and that the transfer operation has been halted.

If the transfer is successfully completed and verification is obtained that the files or objects were received on the remote server, at step 407 the transfer status light turns off to indicate the successful completion of the transfer. This step may also (optionally) involve the deletion of the transferred files or objects on the local device. For example, if verification is obtained that digital images have been transferred to a server, the images may be removed from the digital camera enabling the user to take additional pictures. After successful completion of the transfer, the user may power down and/or disconnect the media capture device from the pipeline device at step 409.

Alternatively, if there is a problem in the transfer at step 406, the transfer failure light is illuminated at step 408. For example, the transfer failure light may be illuminated at step 408 if there was a problem with the data call or with the connection between the camera and the data transfer device. In the currently preferred embodiment, a solid red LED is steadily illuminated to inform the user of a problem with the transfer operation (i.e., a failure). In addition, when the failure light is illuminated, the transfer status light also changes from blinking green to solid green to indicate that digital images remain on the camera. If the failure light is illuminated, at step 408, the user can either decide to wait and try the transfer later or, alternatively, the user can press the transfer button to re-attempt the data transfer.

The process ends at step 409 when either all objects have been sent successfully or, in the event of a failure, if the end user decides to terminate the connection and wait until a later time to attempt the transfer. In the presently preferred embodiment, each digital image stored on the camera is transferred one by one to the remote server in the manner described above. As verification is received that a particular image has been successfully transferred to the remote server, that image is automatically deleted from the camera. This process frees up storage space on the camera, thereby enabling the user to take additional pictures. Another benefit of transferring the images one by one and obtaining verification of each transfer is that the entire transfer operation need not be repeated in the event a problem occurs after several images have been transferred.

D. Events and States of the Transfer Status and Failure Lights

FIG. 5 illustrates the actions of the transfer status light and the transfer failure light of the transfer device in response to certain events. As shown at FIG. 5, if no connection is found or if no media is on the media capture device, both the transfer status light and the transfer failure light are off (i.e., neither light is illuminated). Both lights are also off after the successful transfer of media from the media capture device.

As shown at FIG. 5, if a connection is found and media is on the media capture device, then the transfer status light is illuminated. In the currently preferred embodiment, this is indicated by a steady green light (LED) which is located physically on the transfer button. If the user presses the transfer button or switch, then the transfer status light blinks while media is being transferred. The transfer failure light is off while media is successfully being transferred. In the event a data transfer fails, the transfer failure light is illuminated and the transfer status light goes from blinking to a solid light. In the currently preferred embodiment, the transfer failure light is a red light (LED).

E. Sequence of Internal Operations in Transfer of Data

1. Overview

The transfer device of the present invention provides a media capture device user with the ability to initiate a transfer of information to another device. After a transfer operation has been initiated, the transfer device also provides valuable feedback to the user about the status of the operation. To accomplish the actual transfer of information, the media capture device (referred to below as the "client" device) must also include functionality for transferring information to another device. As previously discussed, in the currently preferred embodiment, all required functionality is supplied on the media capture device so that the media capture device is not dependent upon the installation or availability of particular software on the pipeline or host device to which it is attached. The following illustrates an exemplary transfer operation involving the transfer of information from a "client" digital camera device, including the transfer device of the present invention, through a cellular phone, acting as an intermediary "host" or "pipeline" device, to a remote server. In this example the pipeline device (referred to below as the "host" device) is a cellular phone, however the digital camera may alternatively be connected to a variety of other host devices, such as a personal digital assistant (PDA) handheld device, or the like.

The overall process for transfer of information from the client device may be summarized as follows. The process gets underway upon the establishment of a connection (wireless or wireline) between the client device and a host device; the connection may be permanent or temporary. Starting with default registry information stored in a configuration registry, the client device probes for host devices. This task falls specifically on a physical (or PHY) manager. Based on the information uncovered by this probing, the registry is updated, with information describing discovered host devices and corresponding communication information relevant to each such discovered host device. As part of this step, the PHY manager will ensure TCP/IP connectivity to each such host device.

Once the relevant host device has been discerned, the client device includes the capability of uploading a particular application or driver for placement, and subsequently execution, at the host device. Now, the client device may proceed with "injection" of an appropriate application or driver into the host device(s). The registry for each host device that is connected may be examined, as this will determine what specific task(s) must be undertaken to inject an appropriate application or driver into each such host device. A TCP/IP session is established with the host device, for the specific purpose of injecting the application or driver. The file is opened on the client device; as part of this process, a client-side file handle is obtained. Having obtained a valid file handle for the file to be injected, the method may now proceed to package the file contents for transmission to the host device. In the currently preferred embodiment, the XML protocol is employed for this packaging. Now, using TCP/IP, the packaged file may be transmitted (streamed) from the client device to the host device. In conjunction with this step, a host-side file handle is returned to the client device.

At this point, the execution of the just-injected application or driver at the host device may proceed. Host-side execution may require host-specific operations. In the straightforward case, the host is simply instructed to begin execution of the application or driver. If the host device does not support that functionality, however, execution of the application or driver may be accomplished through indirect means, such as instructing the host to "restart" itself and thereupon execute the application or driver (e.g., by placing the application or driver in a location where the host will automatically load it for execution upon startup). Thereafter, operation between the client and host devices continues as specified in the now-executing application or driver, which itself in turn may unpackage other drivers for execution. In a typical operation, the application or driver would issue particular commands to the client device, for instance, requesting that the client device transmit particular information that is to be processed by the host device, such as uploading digital photographs from the client device to the host device, for wireless transmission by the host device to yet another device (e.g., server computer).

2. Determining Phone Modem Attached

As described above, the sequence of operations begins when a physical connection is established between the client device and a host device. After this physical connection has been established, the client device proceeds to determine the type of host device to which it is connected. The PHY manager probes for new devices over what the registry lists as the then-current communication medium. Communication media may include, for instance, wireless, serial (RS-232) wired, USB, or the like. Depending on the hardware configuration of the client device, it is possible to have multiple communication media active simultaneously. Typically, the registry includes a default (factory preset) configuration registry entry specifying the initial communication medium (or media) available upon initial power up of the client device. For this default connectivity entry and other connectivity entries, the registry includes corresponding default communication rates (baud rates) and corresponding handshake protocols (command set). Using this information, the PHY manager may execute an initial sequence of handshake commands and compare any response received to a list of known responses for identifying a particular host device. For example, to elicit devices that may be connected via RS-232, the PHY manager may begin by sending out corresponding sequences of initialization commands (e.g., AT commands), at different baud, for eliciting a response from any potential host that is connected. For example, the specific string sequence used to verify that a phone modem is attached is as follows:

Send: "ATZ\r" where "\r" is a carriage-return ASCII value.

Receive: "OK"

Probing for host devices continues until all known potential host devices have been enumerated. Based on what is found, the PHY manager updates the registry with information describing which host devices the client device is currently connected to. After connectivity has been established, and provided that there are one or more objects (e.g., digital images) on the media capture device, the transfer status button (LED) is illuminated to indicate that the user may proceed to initiate the transfer.

3. Establish Connection to Remote Server

After the user presses the transfer button to begin an upload of files or objects (e.g., digital images) from the client digital camera device, the transfer operation continues with the establishment of a connection to the remote server to which the images are to be transferred. For example, the following sequence of operations describes the establishment of a dial-up connection to an Internet service provider that may be initiated when the user presses the transfer button.

Send: "ATZ; AT&F0\r"

Receive: "OK"

Send: "ATDT18005551234" where 18005551234 is the phone number of the ISP that is programmed into camera.

Receive: "CONNECT"

Send: user name (This is a value defined by the ISP.)

Send: password (This is a value associated with the user name defined by the ISP)

As illustrated above, the client digital camera device may be pre-configured to include the phone number to be dialed to establish a dial-up connection to the remote server to which images are to be sent. These configuration settings may also include a user identifier so that the images transferred can be associated with a particular user.

4. PPP Connection

Next, the process may negotiate a Point-to-Point Protocol (PPP) connection with the remote server. The Point-to-Point Protocol (or PPP) is a well-known method for transmission of IP packets over serial lines; see, e.g., RFC 1661: The Pointto-Point Protocol (PPP), available from the Network Working Group, the disclosure of which is hereby incorporated by reference.

The PHY manager is also responsible for ensuring that any other low-level connectivity is met such that a state of TCP/IP communication is reached. This is required because TCP/IP may not in fact be operating at the point when the client device first initiates communication. Although TCP/IP configuration may not be yet running at the outset, Point-to-Point Protocol (PPP) may be employed to ensure TCP/IP connectivity, in a manner similar to that commonly done with dial-up Internet connections. For example, Internet service providers typically provide their users with a PPP connection so that the provider's server can respond to user requests, pass them on to the Internet, and forward requested Internet responses back to the users. Use of PPP is made possible due to the fact that most hosts that support a TCP/IP stack will also support PPP within their TCP/IP stack. Accordingly, the client device can initiate a PPP session through well-known means, and thereupon request TCP/IP communication. All told, through use of the available PPP protocol, the client device can initiate TCP/IP connectivity, including determining an IP address for a given host device, even if TCP/IP connectivity does not exist at the outset. In this manner, the PHY manager sets up a communication TCP/IP channel allowing the client device to communicate with the connected host device(s).

5. Server Communication

In the currently preferred embodiment, data is moved from the media capture device to the remote server through the use of an FTP-like capability incorporated into the media capture device (e.g., digital camera) in order to allow it to act like a file server, so that files on that device (e.g., digital images) may be easily accessed by a variety of disparate hosts over standard protocols (e.g., in the same manner that a variety of disparate client devices may access files over the Internet from an FTP server). FTP (File Transfer Protocol), a standard Internet protocol, is the simplest way to transfer data (particularly files) reliably and efficiently between computers on the Internet. Like the HyperText Transfer Protocol (HTTP), which transfers displayable Web pages and related files, and the Simple Mail Transfer Protocol (SMTP), which transfers e-mail, FTP is an application protocol that uses the Internet's TCP/IP protocols. FTP is commonly used to transfer Web page files from their creator to the computer that acts as their server for everyone on the Internet. A particular advantage of FTP is its ability to shield one system from variations or peculiarities in the file storage systems of available hosts. As a result, using FTP, a user can also easily update (delete, rename, move, and copy) files, even though the files themselves reside at a server, located thousands of miles away, that employs a file storage system radically different than that employed by the user's own system. The File Transfer Protocol (FTP) itself is defined by RFC 959, which is hereby incorporated by reference. Implementation of an environment embodying a communication stack and method of operation for providing FTP-like functionality to a digital camera device is described in the above-mentioned, commonly-owned patent application Ser. Nos. 09/660,531 and 09/703,412, which provides further description of the protocol and commands for the picture transfer process. This functionality is used to move data (e.g. digital images) from the media capture device (e.g. digital camera) to a remote server.

6. Transfer Complete

After all objects (e.g., digital images) have been transferred from the media capture device (e.g. digital camera) to the remote server, the TCP/IP communication is terminated by the server. The media capture device waits for this TCP/IP event, then terminates modem link with the cellular phone.

Send: "ATH\r"

Receive: "OK"

Also, as described above, the transfer status light turns off after all objects have been successfully transferred, indicating to the device user that the transfer operation has been successfully completed.

In the currently preferred embodiment, the transfer device transfers one file or object at a time, verifies the arrival of that object at the remote server and then deletes that object from the local device. The process is then repeated for other files or objects. In this manner, the transfer of each file is an atomic operation and part of the work is saved if a connection is lost. For example, if a digital camera user had ten pictures to transfer and five of these pictures were transferred prior to a problem occurring, then only five pictures would remain to be sent. The user would not have to retransmit the first five pictures. This also means that the user would have cleared five pictures from the camera, enabling him or her to take five more pictures.

The present invention enables the digital information to be transferred from the media capture device rather than merely copied to the server. Given the memory limitations of most media capture devices, the ability to verify that a transfer has been successfully completed using the present invention is a considerable benefit as it as enables memory to be freed up on the media capture device. However, although the above discussion refers to files or objects being "transferred" from the device, the transfer device of the present invention may also be used for copying files from the media capture device to the remote server.

F. Alternative Embodiments of the Transfer Device

Figure 6:
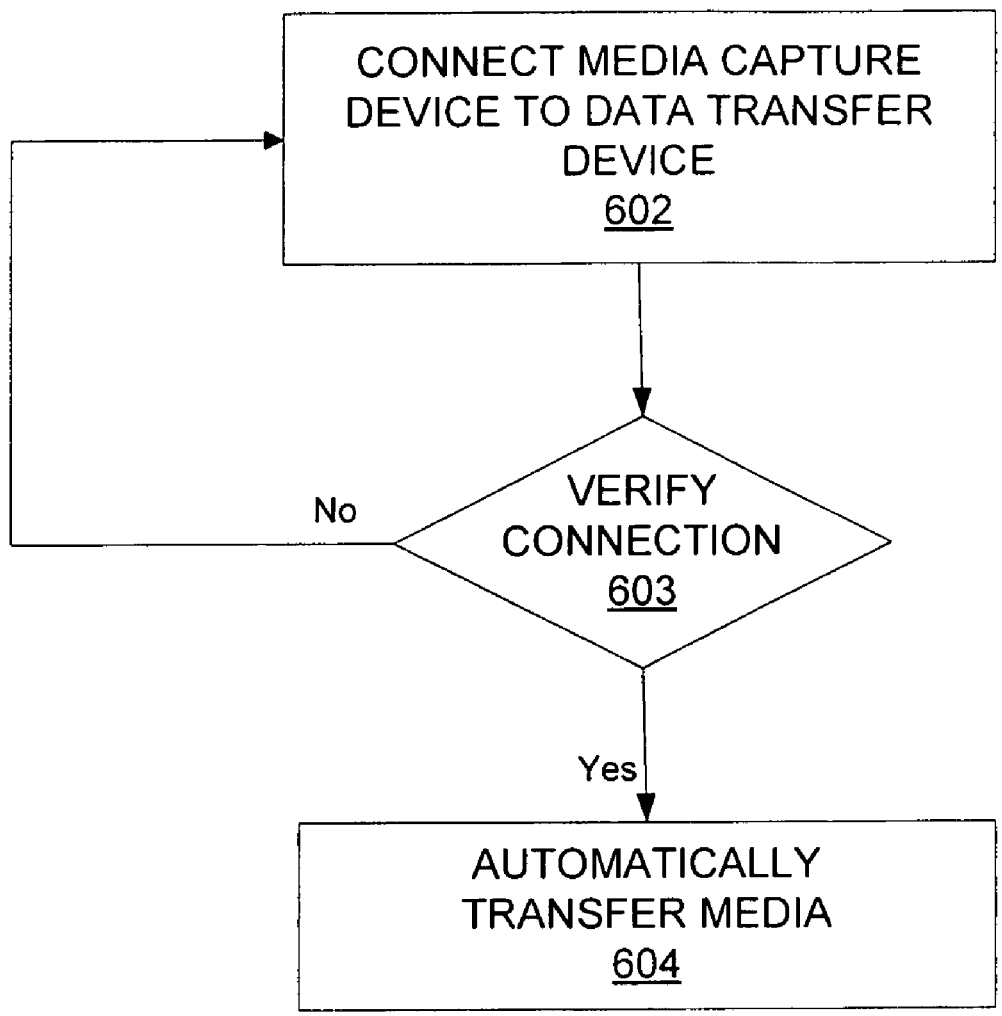
FIG. 6 is a flowchart illustrating an alternative embodiment of transferring data.

In an alternative embodiment of the present invention shown in FIG. 6, the transfer device automatically initiates a data transfer (block 604) when the media capture device (e.g., digital camera) is connected to a data transfer device (e.g., cellular phone) (blocks 602 and 603). In this alternative embodiment, the transfer device is implemented as part of the media capture device and automatically detects the connection of the media capture device to a data transfer device (block 603). The transfer device initiates the data transfer when a connection to a data transfer device is detected (block 604). This alternative embodiment does not require the user to depress a transfer button to initiate the transfer. However, a transfer status light or indicator is provided to inform the user about the status of a pending data transfer. This alternative embodiment may also (optionally) include a status failure light or indicator. If included, the status failure light or indicator is illuminated in the event of a problem with a data transfer.

Another alternative embodiment of the present invention uses a single transfer status light rather than requiring both a transfer status light and a transfer failure light. In this alternative embodiment, if the transfer operation fails, the single transfer light would change from a blinking to a steady state, thereby indicating that files or objects remained on the media capture device. For example, the transfer light would blink green while media was being transferred, but would return to a solid green color in the event a connection was lost.

In another alternative embodiment, the transfer device of the present invention automatically retries the data transfer a pre-selected number of times in the event of a transfer failure. After the transfer has been attempted a certain number of times, the process is terminated and the user is informed of a failure by a transfer failure light. This provides the user with feedback as to whether or not the transfer operation is completed.

Another alternative embodiment utilizes a liquid crystal display (LCD) rather than a light emitting diode (LED) to provide status information to the user. In this embodiment, the LCD displays text to the user indicating the events outlined above. For example, the LCD displays "connecting" or "connected" to indicate that a connection has been established to a data transfer device. While media is being transferred, the LCD displays "transferring". The LCD can similarly be used to provide other feedback to the device user, such as the number of files successfully transferred, or, alternatively, that certain problems have occurred with a transfer operation.

The transfer device also, in an alternative embodiment, utilizes the display resources of a connected pipeline device, such as a cellular telephone, to provide feedback about the status of a transfer operation involving the pipeline device. For example, a digital camera may be connected to a data-capable cellular phone to upload pictures (i.e., digital images) to a remote server. The digital camera may utilize the LCD or other display resources of the cellular phone to provide feedback to the user. The display resources of the cellular phone could be used instead of the transfer status light and transfer failure light of the currently preferred embodiment as a means of informing the user about the transfer. These display resources could, of course, be utilized in addition to (rather than in lieu of) the transfer status and failure lights.

In addition to the above (or as an alternative to the above) visual feedback, the transfer device may provide audible feedback to the user in response to certain actions or events. For example, an audible "happy" sound may be generated when files have been successfully transferred. In the case of a failed transfer operation, an audible "bad" sound may be issued. Those skilled in the art will appreciate that a number of other variations are possible to provide feedback to the user through visual and/or audible means.

While the invention is described in some detail with specific reference to a single preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method facilitating transfer of information from an image capture device to a remote host device, the method comprising:
   establishing a connection between an image capture device and a pipeline device;
   determining, by the image capture device, whether the pipeline device is configured to transfer information from the image capture device to a remote host device that is capable of communication with said image capture device via the pipeline device;
   if the pipeline device is not configured to transfer the information, automatically sending a driver from the image capture device to the pipeline device and installing the driver on the pipeline device, wherein the driver enables the pipeline device to transfer the information;
   automatically establishing a wireless network connection between the image capture device and the remote host device, wherein the pipeline device enables communication between the image capture device and the remote host device without user installation of dedicated software on the pipeline device or the remote host device for enabling said communication, wherein said image capture device is preconfigured to establish the wireless network connection with the remote host device via the pipeline device upon establishing the connection with the pipeline device;
   upon establishing the wireless network connection, automatically verifying that the wireless network connection has been established between said image capture device and said remote host device and automatically initiating a transfer of information from said image capture device, through said pipeline device, to said remote host device;
   automatically providing notification that said transfer of information from said image capture device, through said pipeline device, to said remote host device is in process; and
   automatically providing notification of successful completion of said transfer of information by one of illumination or extinguishing of a light on said data capture device.

2. The method of claim 1, wherein said notification that said transfer of information is in process is provided by illumination of a light on said image capture device.

3. The method of claim 2, wherein said light is a light emitting diode (LED).

4. The method of claim 2, wherein said light blinks periodically while said transfer of information is in process.

5. The method of claim 1, wherein said notification that said transfer of information is in process is provided by a liquid crystal display (LCD).

6. The method of claim 1, wherein said notification that said transfer of information is in process is provided by audio signal.

7. The method of claim 1, further comprising:
   if said transfer of information is not successfully completed, automatically providing notification of failure.

8. The method of claim 7, wherein said notification of failure is provided by illumination of a light.

9. The method of claim 8, wherein said light is a light emitting diode (LED).

10. The method of claim 7, wherein said notification of failure is provided by a liquid crystal display (LCD).

11. The method of claim 1, further comprising:
    providing notification that the connection between the image capture device and the pipeline device has been established.

12. The method of claim 1, wherein automatically sending the data from the image capture device to the pipeline device comprises:
    determining, by the image capture device, that the driver is associated with the pipeline device, wherein the driver is stored on the image capture device;
    examining a registry of the pipeline device to determine specific actions that, when performed by the pipeline device, will cause the driver to be installed on the pipeline device; and
    instructing the pipeline device to perform the specific actions.

13. The method of claim 1, further comprising:
probing for the pipeline device before establishing the connection;
discovering the pipeline device based on the probing; and
updating a registry of the image capture device with information identifying the pipeline device and properties of the pipeline device.

14. A method facilitating transfer of information from an image capture device to a second device capable of communicating with said image capture device, the method comprising:
establishing a connection between an image capture device and a pipeline device;
determining, by the image capture device, whether the pipeline device is configured to transfer information from the image capture device to a second device;
if the pipeline device is not configured to transfer the information, automatically sending a driver from the image capture device to the pipeline device and installing the driver on the pipeline device, wherein the driver enables the pipeline device to transfer the information;
establishing a wireless network connection between the image capture device and the second device via the pipeline device, wherein the pipeline device enables communication between the image capture device and the second device without user installation of dedicated software on the pipeline device or the second device for enabling said communication, wherein said image capture device is preconfigured to establish the wireless network connection with the second device via the pipeline device upon establishing the connection with the pipeline device;
upon establishing the wireless network connection between the image capture device and the second device, automatically providing notification of the establishment of connectivity between said image capture device and said second device, enabling immediate automatic initiation of a transfer of information from said image capture device to said second device through said pipeline device;
upon initiation of a transfer of information from said image capture device to said second device, automatically providing feedback while said transfer of information is in process; and
automatically providing notification of completion of said transfer of information.

15. The method of claim 14, wherein notification of establishment of connectivity is provided by a light emitting diode (LED) on said image capture device.

16. The method of claim 14, wherein automatically providing notification of establishment of connectivity is provided by a liquid crystal display (LCD) on said image capture device.

17. The method of claim 14, wherein automatically providing feedback includes illuminating a light emitting diode (LED) on said image capture device.

18. The method of claim 17, wherein said light emitting diode (LED) blinks on and off while said transfer of information is in process.

19. The method of claim 14, wherein automatically providing feedback includes providing feedback through a liquid crystal display (LCD) on said image capture device.

20. The method of claim 14, wherein automatically providing notification of completion includes providing feedback through a liquid crystal display (LCD) on said image capture device.

21. The method of claim 14, wherein automatically providing notification of completion includes providing notification through a light emitting diode (LED) on said image capture device.

22. The method of claim 21, wherein said LED is extinguished upon completion of said transfer of information.

23. The method of claim 14, wherein automatically providing notification of completion includes providing notification through a liquid crystal display (LCD) on said image capture device.

24. The method of claim 14, further comprising:
if said transfer of information is not successfully completed, automatically providing notification of failure of said transfer of information through at least one of a light emitting diode (LED) on said image capture device or a liquid crystal display (LCD) on said image capture device.

25. The method of claim 14, further comprising:
providing notification that the connection between the image capture device and the pipeline device has been established.

26. A method facilitating transfer of information from an image capture device to a host device, the method comprising:
upon establishing a wireless network connection between a data capture device and a host device that is capable of communicating with said image capture device, automatically sending at least one of a driver or an application that is executable on the host device from the image capture device to the host device and installing the at least one of the driver or the application on the host device, wherein the at least one of the driver or the application enables the host device to transfer the information;
automatically verifying that the wireless network connection has been established between said image capture device and said host device and automatically initiating an immediate transfer of information from said image capture device using at least one of said driver or said application;
automatically providing notification that said transfer of information is in process;
automatically providing notification of successful completion of said transfer of information by one of illumination or extinguishing of a light on said image capture device; and
automatically deleting said information from said image capture device upon successful completion of said transfer.

27. The method of claim 26, wherein the wireless network connection is a wireless internet connection.

28. An image capture device, comprising:
a memory to store instructions for transferring digital content to a remote server; and
a processor, connected with the memory, to execute the instructions, wherein the instructions cause the processor to:
upon establishing a wireless network connection between an image capture device and a host device that is capable of communicating with said image capture device, automatically send at least one of a driver or an application that is executable on the host device from the image capture device to the host device and install the at least one of the driver or the application on the host device, wherein the at least one of the driver or the application enables the host device to transfer the information;

automatically verify that the wireless network connection has been established between said image capture device and said host device and automatically initiate an immediate transfer of information from said image capture device using at least one of said driver or said application;

automatically provide notification that said transfer of information is in process;

automatically provide notification of successful completion of said transfer of information; and automatically delete said information from said image capture device upon successful completion of said transfer.

29. The image capture device of claim 28, further comprising the instructions to cause the processor to:

determine that at least one of the driver or the application is associated with the pipeline device, wherein at least one of the driver or the application is stored on the image capture device;

examine a registry of the pipeline device to determine specific actions that, when performed by the pipeline device, will cause at least one of the driver or the application to be installed on the pipeline device; and instruct the pipeline device to perform the specific actions.

* * * * *